(12) United States Patent
Aihara et al.

(10) Patent No.: US 7,582,367 B2
(45) Date of Patent: *Sep. 1, 2009

(54) CERAMIC MEMBER AND MANUFACTURING METHOD FOR THE SAME

(75) Inventors: Yasufumi Aihara, Nagoya (JP); Hiroto Matsuda, Ogaki (JP); Kazuhiro Nobori, Handa (JP); Tsutomu Kato, Handa (JP)

(73) Assignee: NGK Insulators, Ltd., Nagoya (JP)

( * ) Notice: Subject to any disclaimer, the term of this patent is extended or adjusted under 35 U.S.C. 154(b) by 643 days.

This patent is subject to a terminal disclaimer.

(21) Appl. No.: 11/236,223

(22) Filed: Sep. 27, 2005

(65) Prior Publication Data

US 2006/0073349 A1 Apr. 6, 2006

(30) Foreign Application Priority Data

Sep. 30, 2004 (JP) ............................ P2004-289089
Mar. 29, 2005 (JP) ............................ P2005-096458

(51) Int. Cl.
*B32B 18/00* (2006.01)
(52) U.S. Cl. ...................... 428/701; 428/702; 361/234; 264/642; 264/643; 118/723 R; 427/419.2
(58) Field of Classification Search ................. None
See application file for complete search history.

(56) References Cited

U.S. PATENT DOCUMENTS

| | | | | |
|---|---|---|---|---|
| 5,573,690 A | * | 11/1996 | Nobori et al. | 219/458.1 |
| 5,756,215 A | * | 5/1998 | Sawamura et al. | 428/446 |
| 6,139,983 A | * | 10/2000 | Ohashi et al. | 428/698 |
| 7,220,497 B2 | * | 5/2007 | Chang | 428/701 |
| 7,329,467 B2 | * | 2/2008 | Billieres et al. | 428/701 |
| 2003/0051811 A1 | * | 3/2003 | Uchimaru et al. | 156/345.1 |
| 2004/0165871 A1 | * | 8/2004 | Natsuhara et al. | 392/418 |
| 2004/0234824 A1 | * | 11/2004 | Yamada | 428/701 |
| 2005/0037193 A1 | * | 2/2005 | Sun et al. | 428/332 |
| 2005/0227118 A1 | | 10/2005 | Uchimaru et al. | |

FOREIGN PATENT DOCUMENTS

| | | |
|---|---|---|
| JP | 11-026192 A1 | 1/1999 |
| JP | 2001-031484 A1 | 2/2001 |
| JP | 2002-068838 A1 | 3/2002 |
| JP | 2002-255647 A1 | 9/2002 |
| JP | 2002-356387 A1 | 12/2002 |

\* cited by examiner

*Primary Examiner*—John J. Zimmerman
*Assistant Examiner*—Aaron Austin
(74) *Attorney, Agent, or Firm*—Burr & Brown

(57) ABSTRACT

A ceramic member is provided including a base including an alumina sintered body, an yttria sintered body formed on the alumina sintered body, an intermediate layer including yttrium and aluminum formed between the alumina sintered body and the yttria sintered body, and a metallic member buried in the intermediate layer of the base. A difference between the thermal expansion coefficient of the alumina sintered body and that of the yttria sintered body is equal to or less than about $0.50 \times 10^{-6}$/K, and the thermal expansion coefficient of the alumina sintered body is greater than the thermal expansion coefficient of the yttria sintered body. The alumina sintered body, the intermediate layer, the yttria sintered body, and the metallic member are formed into an integrated sintered body, and the content of yttria in the yttria sintered body is 99 wt % or more.

16 Claims, 7 Drawing Sheets

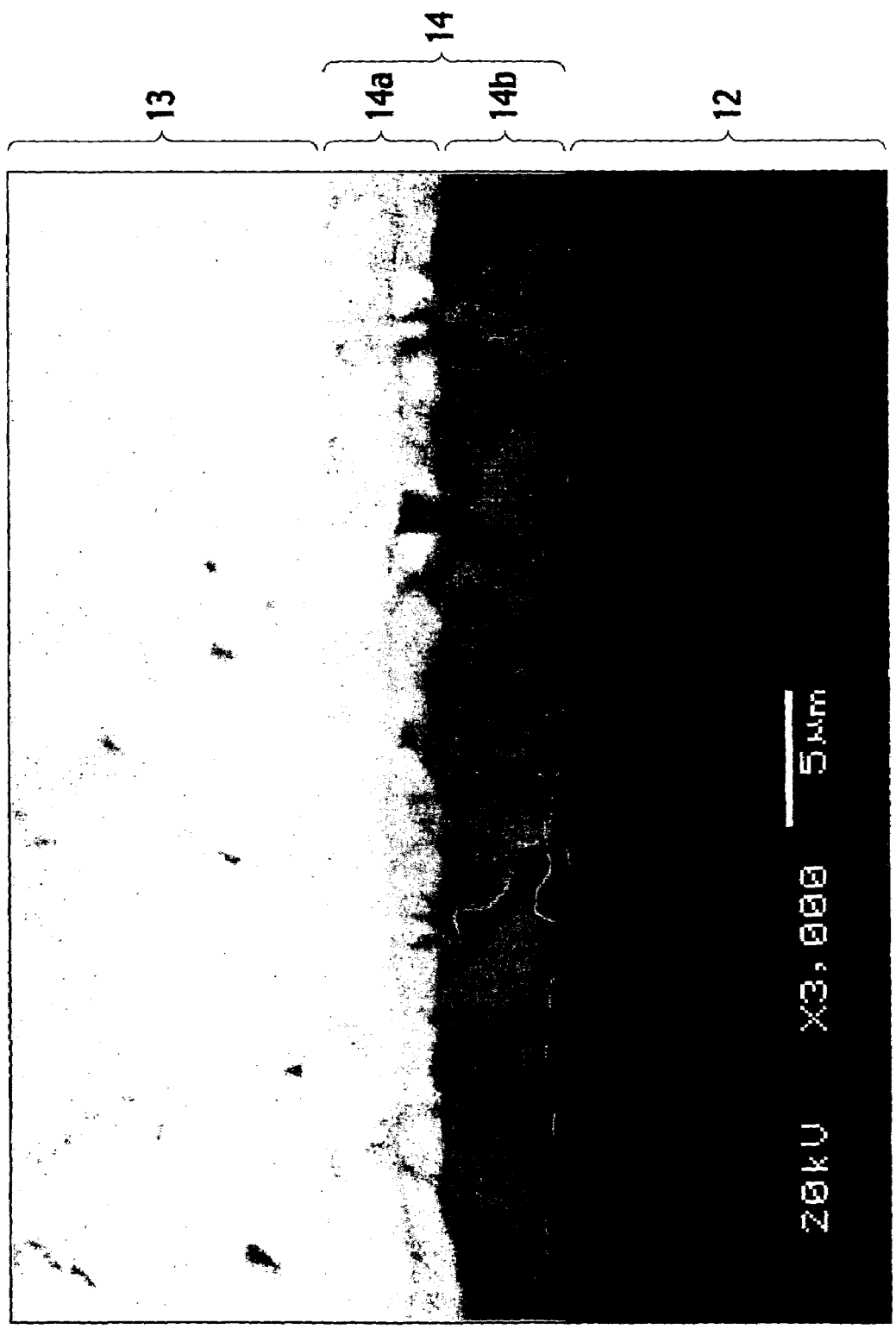

CERAMIC MEMBER AND MANUFACTURING METHOD FOR THE SAME

CROSS REFERENCE TO RELATED APPLICATIONS

This application is based upon and claims the benefit of priority from prior Japanese Patent Applications No. 2004-289089, filed on Sep. 30, 2004 and No. 2005-96458, filed on Mar. 29, 2005; the entire contents of which are incorporated herein by reference.

BACKGROUND OF THE INVENTION

1. Field of the Invention

The present invention relates to a ceramic member and a manufacturing method for the same.

2. Description of the Related Art

A ceramic member such as a heater or an electrostatic chuck is used in a conventional semiconductor manufacturing apparatus or liquid crystal manufacturing apparatus. These ceramic members are ceramics, in which a metallic member such as an electrode or a resistance heating element is buried. Such a ceramic member is generally formed by aluminum nitride, alumina, or the like having high heat resistance and high corrosion resistance.

Moreover, forming an anticorrosion member used under a corrosive gas environment by high corrosion resistant yttria has been proposed (Japanese Patent Application Laid-open Nos. 2002-68838 and 2002-255647). Furthermore, an anticorrosion member having an yttria film formed on an alumina surface by plasma spraying has been proposed (Japanese Patent Application Laid-open No. 2001-31484).

In recent years, however, a ceramic member such as an electrostatic chuck or a heater has been required a higher corrosion resistance than usual. For example, since in-situ cleaning has been introduced to an etching process, the ceramic member is exposed to a stricter halogen corrosive gas plasma environment. Therefore, even with a ceramic member made of aluminum nitride or alumina, avoiding corrosion may be impossible.

In order to solve the problem described above, applying the higher corrosion resistant yttria to a ceramic member is attempted. However, new problems described below have occurred. Yttria has poor mechanical strength such as bending strength or fracture toughness. Therefore, when malting a ceramic member of yttria, it may break during a manufacturing process, and yields may thus decrease. Cracks or chipping may occur while processing for making a hole in which a terminal joined with a metallic member such as an electrode or a resistance heating element will be inserted. In addition, when brazing the terminal to the metallic member, it may break due to thermal stress.

Meanwhile, a yttria film formed by plasma spraying may be applied to a ceramic member. However, since the yttria film formed by plasma spraying is porous, corrosion resistance is insufficient, and particle generation cannot be prevented. Moreover, high volume resistivity required for using as a dielectric layer of an electrostatic chuck cannot be provided.

SUMMARY OF THE INVENTION

Therefore, an object of the present invention is to provide a ceramic member having high corrosion resistance and high mechanical strength, and a manufacturing method for the same.

A ceramic member according to an embodiment of the present invention includes a base including an alumina sintered body, and an yttria sintered body formed on the alumina sintered body and exposed to a corrosive gas, and a metallic member buried in the base.

A part exposed to the corrosive gas is formed by the yttria sintered body. The metallic member is buried in the base. Therefore, the ceramic member has high corrosion resistance. In addition, a part of the base is formed by the alumina sintered body having high mechanical strength. Moreover, since the coefficient of thermal expansion of the alumina sintered body is close to that of the yttria sintered body, they can be tightly joined. Therefore, the ceramic member has high mechanical strength.

A manufacturing method for a ceramic member according to an embodiment of the present invention includes forming an alumina sintered body, forming an yttria sintered body, forming a metallic member, and integrating the alumina sintered body, the yttria sintered body and the metallic member.

This allows for the provision of a ceramic member comprising a base, which includes an alumina sintered body and a yttria sintered body formed on the alumina sintered body and exposed to a corrosive gas, and a metallic member buried in the base.

BRIEF DESCRIPTION OF THE DRAWINGS

FIG. 7 is a SEM micrograph of an intermediate layer and its surroundings according to a working example 1 of the present invention.

DETAILED DESCRIPTION OF THE INVENTION

Ceramic Member

A ceramic member according to one embodiment comprises a base, which includes an alumina sintered body, and an yttria sintered body formed on the alumina sintered body and exposed to a corrosive gas, and a metallic member buried in the base. A part exposed to the corrosive gas is formed by an yttria sintered body. The metallic member is buried in the base. Therefore, the ceramic member has high corrosion resistance. Moreover, a part of the base is formed by an alumina sintered body having high mechanical strength. Furthermore, since the alumina sintered body and the yttria sintered body have a similar coefficient of thermal expansion, they are tightly joined together. Therefore, the ceramic member also has high mechanical strength.

An electrostatic chuck including an electrostatic electrode as a metallic member is exemplified as such a ceramic member.

Electrostatic Chuck

Figure 1A:
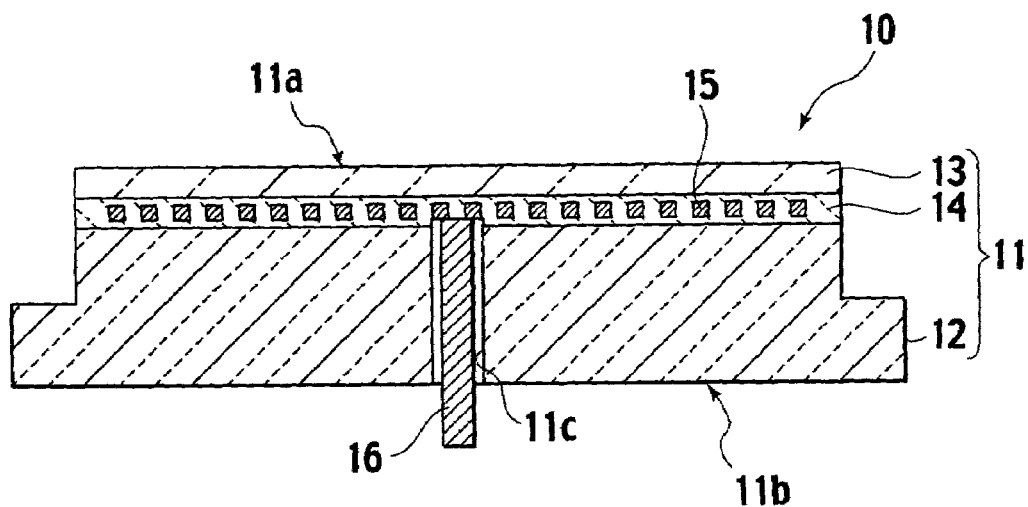
FIG. 1A is a cross sectional view taken along line 1a-1a of an electrostatic chuck according to an embodiment of the present invention.
Figure 1B:
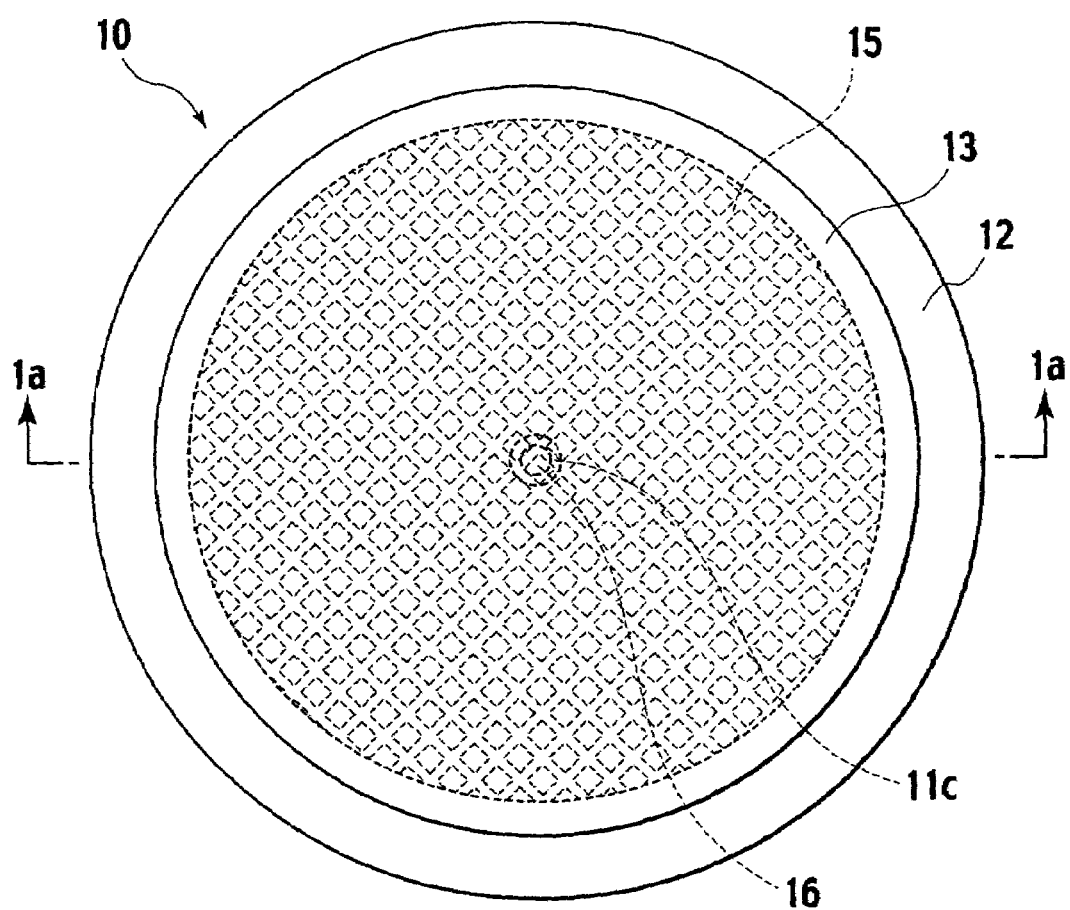
FIG. 1B is a plan view thereof.

As shown in FIGS. 1A and 1B, an electrostatic chuck 10 comprises a base 11, an electrostatic electrode 15, and a terminal 16. The base 11 has a substrate mounting surface 11a and holds a substrate such as a semiconductor substrate or a liquid crystal substrate mounted on the substrate mounting surface 11a. The electrostatic electrode 15 is buried in the base 11. The base 11 includes an alumina sintered body 12, a yttria sintered body 13, and an intermediate layer 14 including yttrium and aluminum.

The alumina sintered body 12 supports the electrostatic electrode 15 and the yttria sintered body 13. The alumina sintered body 12 is a sintered body including at least alumina ($Al_2O_3$). Aside from alumina, the alumina sintered body 12 may include zirconia ($ZrO_2$), magnesia (MgO), silica ($SiO_2$) or the like. Note that the alumina content included in the alumina sintered body 12 is preferably about 95 weight % or greater. This can prevent contamination of the substrate. The alumina content in the alumina sintered body 12 is preferably about 98 weight % or greater.

Moreover, the alumina sintered body 12 may include about 500 to about 5000 ppm carbon. This can provide the alumina sintered body 12 made of very fine grain size. Therefore, the alumina sintered body 12 can have higher mechanical strength. In addition, provision of the alumina sintered body 12 evenly colored in black with less tonal unevenness and unremarkable color shading is possible. The carbon content is preferably about 500 to about 2000 ppm.

Furthermore, the relative density of the alumina sintered body 12 is preferably about 95% or greater. This can increase in mechanical strength of the alumina sintered body 12. The relative density of the alumina sintered body 12 is more preferably about 98% or greater. The four-point bending strength (JIS R1601) of the alumina sintered body 12 in room temperature is preferably about 400 MPa or greater. The four-point bending strength of the alumina sintered body 12 is more preferably about 600 MPa or greater. The average grain size of the alumina sintered body 12 is preferably about 1 to about 10 μm, and more preferably about 1 to about 3 μm.

The yttria sintered body 13 is formed on the alumina sintered body 12, and constitutes a part exposed to a corrosive gas. The yttria sintered body 13 has high corrosion resistance. The yttria sintered body 13 has high corrosion resistance to, for example, a halogen corrosive gas such as nitrogen fluoride ($NF_3$), and also has high corrosion resistance to a plasma corrosive gas. Moreover, the yttria sintered body 13 also has sufficient corrosion resistance to in-situ cleaning in an etching process.

The yttria sintered body 13 constitutes at least a part of the electrostatic chuck 10 exposed to a corrosive gas. In the case where the substrate mounting surface 11a, on which a substrate is mounted and which contacts with the substrate, is exposed to a corrosive gas, at least the substrate mounting surface 11a is formed by the yttria sintered body 13, and the remaining parts are not required to be formed by the yttria sintered body as shown in FIG. 1. A part unexposed to a corrosive gas due to a ring member or the like mounted thereupon is not required to be formed by the yttria sintered body. Needless to say, however, the part unexposed to the corrosive gas may be formed by the yttria sintered body.

In FIGS. 1A and 1B, the yttria sintered body 13 is formed on the electrostatic electrode 15 and serves as a dielectric layer of the electrostatic chuck 10, which uses Coulombic force as an electrostatic chucking force. Note that Coulombic force is an electrostatic chucking force occurring between the substrate mounted on a dielectric layer (on the substrate mounting surface 11a) and the electrostatic electrode 15.

In this case, the volume resistivity (JIS C2141) of the yttria sintered body 13 at room temperature is preferably about $1 \times 10^{15}$ Ω·cm or greater. This can provide a high chucking force and improve a dechucking response. The volume resistivity of the yttria sintered body 13 at room temperature is more preferably about $1 \times 10^{16}$ Ω·cm or greater.

The thickness of the yttria sintered body 13 is preferably about 0.3 to about 0.5 mm. This can provide a high chucking force and improve a dechucking response. The thickness of the yttria sintered body 13 is more preferably about 0.3 to about 0.4 mm.

The yttria sintered body 13 is a sintered body including at least yttria ($Y_2O_3$). Aside from yttria, the yttria sintered body 13 may include alumina, silica, zirconia, silicon carbide (SiC), silicon nitride ($Si_3N_4$) or the like as a reinforcing agent or a sintering additive. This can improve mechanical strength such as bending strength or fracture toughness of the yttria sintered body 13. Note that the yttria content included in the yttria sintered body 13 is preferably about 90 weight % or greater. This can prevent decrease in the corrosion resistance of the yttria sintered body 13 and contamination of the substrate. The yttria content in the yttria sintered body 13 is more preferably about 99 weight % or greater.

The relative density of the yttria sintered body 13 is preferably about 95% or greater. This can provide the yttria sintered body 13 having higher volume resistivity and improved mechanical strength such as improved bending strength or improved fracture toughness. The relative density of the yttria sintered body 13 is more preferably about 98% or greater. The average grain size of the yttria sintered body 13 is preferably about 10 μm or less.

The alumina sintered body 12 and the yttria sintered body 13 have close coefficients of thermal expansion and also have high chemical affinity. Therefore, the alumina sintered body 12 and the yttria sintered body 13 can be tightly joined together. As a result, forming the base 11 by the alumina sintered body 12 and the yttria sintered body 13 can improve the mechanical strength of the electrostatic chuck 10.

Particularly, the difference between the coefficient of thermal expansion (CTE) of the alumina sintered body 12 and the yttria sintered body 13 is preferably equal to or less than about $0.50 \times 10^{-6}$/K. Note that the difference in the coefficient of thermal expansion can be the measurement of a difference in the coefficient of thermal expansion from room temperature to about 1200° C. According to this, the alumina sintered body can be more tightly joined with the yttria sintered body. The difference between the coefficient of thermal expansion of the alumina sintered body 12 and the yttria sintered body 13 is more preferably about $0.30 \times 10^{-6}$/K or less, yet more preferably about $0.10 \times 10^{-6}$/K or less.

Moreover, the coefficient of thermal expansion of the alumnina sintered body 12 is preferably greater than that of the yttria sintered body 13. This can obtain compressive stress as thermal stress on the yttria sintered body 13 during a temperature dropping step after sintering in the manufacturing process. Therefore, cracks in the yttria sintered body 13 can be prevented. For example, adjustment of the zirconia content, the magnesia content, the silica content and the like included in the alumina sintered body 12 and the alumina content, the silica content, the zirconia content, the silicon carbide content, the silicon nitride content and the like included in the yttria sintered body 13 allows provision of a suitable difference in coefficient of thermal expansion. A suitable difference in the coefficient of thermal expansion may be provided by setting the alumina content and the silica content included in the alumina sintered body 12 to be about 98 weight % and about 2 weight %, respectively, and the yttria content included in the yttria sintered body 13 to be about 99.9 weight % or greater, for example. This is one example among many.

The intermediate layer 14 including yttrium and aluminum is formed between the alumina sintered body 12 and the yttria sintered body 13. In other words, the alumina sintered body 12 and the yttria sintered body 13 are joined together via the intermediate layer 14 including yttrium and aluminum. This allows the alumina sintered body 12 to be more tightly joined with the yttria sintered body 13.

The intermediate layer 14 includes yttrium and aluminum, however, the other kinds of compounds included in the intermediate layer 14 are not limited. The intermediate layer 14 may include, for example, an yttrium oxide and an aluminum oxide, or may include an oxide of yttrium and aluminum. More specifically, the intermediate layer 14 can include YAG ($3Y_2O_3 \cdot 5Al_2O_3$: yttrium aluminum garnet), YAM ($2Y_2O_3 \cdot Al_2O_3$), YAL ($Y_2O_3 \cdot Al_2O_3$), or the like.

It is preferable that the intermediate layer 14 includes a plurality of layers having different contents of the yttrium and the aluminum. The intermediate layer 14 may include a YAG layer and a YAM layer, for example. This allows gradual change in composition between the alumina sintered body 12 and the yttria sintered body 13. Therefore, more tightly joining the alumina sintered body 12 with the yttria sintered body 13.

The thickness of the base 11 (distance from the substrate mounting surface 11a to the back side 11b) is preferably equal to or less than about 5 mm. This can decrease thermal resistance and improve thermal characteristic of the electrostatic chuck 10. The thickness of the base 11 is more preferably about 1 to about 3 mm.

It is preferable that the center line average surface roughness (Ra)(JISB0601) of the substrate mounting surface 11a of the base 11 is equal to or less than about 0.6 µm. This can provide a sufficient chucking force for chucking a substrate and prevent generation of particles due to friction of the substrate and the base 11. It is more preferable that the center line average surface roughness is equal to or less than about 0.4 µm. A hole 11c used to insert the terminal 16 is formed in the back side 11b of the base 11.

The electrostatic electrode 15 is a metallic member buried in the base 11. The electrostatic electrode 15 is supplied with electric power and generates Coulombic force as an electrostatic chucking force. It is preferable that the electrostatic electrode 15 intervenes between the alumina sintered body 12 and the yttria sintered body 13 as shown in FIG. 1. This allows easier manufacturing of the electrostatic chuck 10 than manufacturing of the electrostatic electrode 15 buried in the alumina sintered body 12 or in the yttria sintered body 13. Moreover, the yttria sintered body 13 can serve as a dielectric layer of the electrostatic chuck 10 using Coulombic force. As a result, the electrostatic chuck 10 can provide a high chucking force. In addition, a dechucking response can be improved.

In this case, the electrostatic electrode 15 is only necessary to intervene between the alumina sintered body 12 and the yttria sintered body 13. For example, as shown in FIG. 1, the electrostatic electrode 15 may be positioned within the intermediate layer 14 between the alumina sintered body 12 and the yttria sintered body 13, or may be in contact with the alumina sintered body 12 and the yttria sintered body 13. Note that the electrostatic electrode 15 may be buried in the alumina sintered body 12 or the yttria sintered body 13. In this case, the yttria sintered body 13 is formed on the alumina sintered body 12 via an intermediate layer without making the electrostatic electrode 15 intervene therebetween.

It is preferable that the difference between the coefficient of thermal expansion of the electrostatic electrode 15 and the alumina sintered body 12, and also the difference between the thermal expansion coefficient of the electrostatic electrode 15 and the yttria sintered body 13 is equal to or less than about $3 \times 10^{-6}/K$. This can increase adhesion of the electrostatic electrode 15 and the base 11 and prevent cracks in peripheral regions of the electrostatic electrode 15 in the base 11.

It is preferable that the electrostatic electrode 15 be made of a refractory material. It is preferable that, for example, the electrostatic electrode 15 is made of a refractory material having a melting point of about 1650° C. or greater. This can provide an electrostatic chuck 10 suitable to be used in a high temperature environment. In addition, deformation of the electrostatic electrode 15 can be prevented in a manufacturing process for an electrostatic chuck 10. More specifically, the electrostatic electrode 15 may be made of a refractory material including at least one of tungsten (W), niobium (Nb), molybdenum (Mo), tungsten carbide (WC), molybdenum carbide (MoC), a tungsten—molybdenum alloy, hafnium (Hf), titanium (Ti), tantalum (Ta), rhodium (Rh), rhenium (Re), or platinum (Pt).

The form of the electrostatic electrode 15 is not limited. For example, a printed electrode formed by printing a printing paste including an electrode material powder, a bulk or a sheet (foil) of electrode material, a thin film formed by Chemical Vapor Deposition (CVD) or Physical Vapor Deposition (PVD), or the like may be used. It is particularly preferable that the electrostatic electrode 15 is printed electrode formed by printing a printing paste including an electrode material powder. This can improve flatness of the electrostatic electrode 15.

The shape of the electrostatic electrode 15 is not limited. The shape thereof may be circular shape, semicircle, mesh (metallic mesh), comb-shape, perforated-shape (punching metal), or the like. The electrostatic electrode 15 may be a unipolar type, a bipolar type, or a further divided type.

During the process of manufacturing the electrostatic chuck 10, the components of the alumina sintered body 12 and the yttria sintered body 13 mutually diffuse through gaps and a periphery of the electrostatic electrode 15. Consequently, the intermediate layer 14 is formed around the electrostatic electrode 15 and covers it. As a result, the electrostatic electrode 15 is positioned within the intermediate layer 14 between the alumina sintered body 12 and the yttria sintered body 13, as shown in FIG. 1.

It is preferable that the flatness of the electrostatic electrode 15 is equal to or less than about 200 µm. It is more preferable that the flatness is equal to or less than about 100 µm. This can provide a uniform chucking force over entire substrate mounting surface 11a.

The terminal 16, which connects the electrostatic electrode 15 to a power supply member such as a power supply cable supplying electric power, is joined with the electrostatic electrode 15. The terminal 16 is inserted through the hole 11c in the base 11. The electrostatic electrode 15 and the terminal 16 are joined together by brazing or welding, for example.

It is preferable that the alumina sintered body 12, the yttria sintered body 13, and the electrostatic electrode 15 are formed into an integrated sintered body. This allows the alumina sintered body 12, the yttria sintered body 13, and the electrostatic electrode 15 to be tightly joined. In addition, the integrated sintered body can prevent electric defects such as arcing. Moreover, an electrostatic chuck having a high thermal conductivity and cooling capability as compared to using an organic adhesive to join them together can be provided. It is particularly preferable that such an integrated sintered body is provided by hot pressing.

Manufacturing Method for Ceramic Member

A manufacturing method for a ceramic member according to this embodiment includes the forming an alumina sintered body, forming an yttria sintered body, forming a metallic member, and integrating the alumina sintered body, the yttria sintered body and the metallic member. Note that the order of forming the alumina sintered body, the yttria sintered body, and the metallic member is not limited. Alternatively, two or more of the steps of forming the alumina sintered body, forming the yttria sintered body, forming the metallic member, and integrating them into the integrated sintered body may be conducted at the same time. Further alternatively, a single step described above may be conducted over multiple sub-steps.

As such a manufacturing method for a ceramic member, a manufacturing method for the electrostatic chuck 10 having electrostatic electrode 15 as a metallic member is described as an example.

Manufacturing Method for Electrostatic Chuck

Figure 2A:
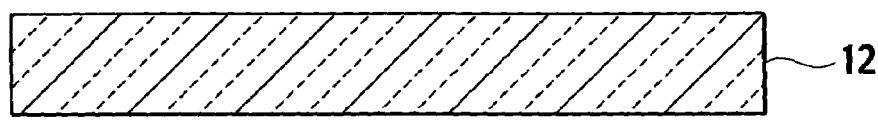
FIGS. 2A through 2E show a manufacturing method for the electrostatic chuck according to an embodiment of the present invention.

Firstly, as shown in FIG. 2A, an alumina sintered body 12 is formed. More specifically, a binder, water, a dispersing agent, and the like are added to and mixed with a raw powder for the alumina sintered body 12, resulting in slurry. The raw powder may be an alumina powder, a mixed powder of an alumina powder and a zirconia powder, a mixed powder of an alumina powder and a magnesia powder, or a mixed powder of an alumina powder and a silica powder. Note that it is preferable that the alumina content included in the raw powder is equal to or greater than about 95 weight %. It is more preferable that the alumina content is equal to or greater than about 98 weight %. Moreover, it is preferable that the purity of the alumina powder is about 99.5 weight % or greater, more preferably, about 99.9 weight % or greater. Furthermore, it is preferable that the average particle size of the alumina powder or the mixed powder is about 0.2 to about 1.0 μm.

Moreover, carbon, or an organic binder which will provide carbon, may be added to the raw powder in order to obtain the alumina sintered body 12 including an amount of carbon of about 500 to about 5000 ppm. This allows for the provision of the alumina sintered body 12 having high strength and being evenly colored in black.

The slurry is then granulated through a spray drier or the like, resulting in granules. An alumina compact is formed by mold pressing, cold isostatic pressing (CIP), slip casting or the like using the granules. The alumina sintered body 12 is formed by sintering the alumina compact through hot pressing, atmospheric sintering, or the like in inactive gas such as nitrogen gas or argon gas, under a reduced pressure, or in an oxidized atmosphere such the air.

It is preferable that a sintering temperature of an alumina compact is about 1400 to 1700° C., more preferably about 1400 to about 1600° C. In other words, sintering the alumina compact at a low temperature prevents excessive grain growth of the alumina sintered body 12. As a result, the mechanical strength of the alumina sintered body 12 can be improved.

Figure 2B:
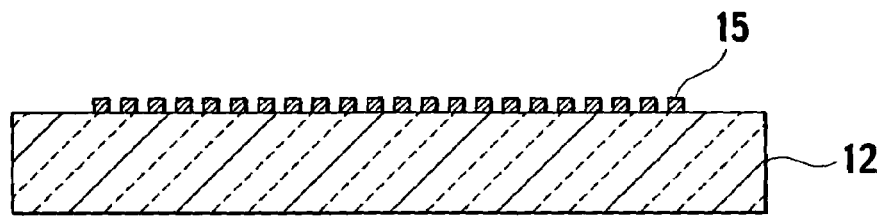

As shown in FIG. 2B, an electrostatic electrode 15 is formed on the alumina sintered body 12. The electrostatic electrode 15 may be formed by, for example, printing a printing paste including an electrode material powder on the surface of the alumina sintered body 12 through screen printing. This can improve the flatness of the electrostatic electrode 15, and easily and very precisely form a variety of shapes of electrostatic electrode 15. Therefore, screen printing is preferable.

In this case, it is preferable that a printing paste is made by adding alumina powder or yttria powder to an electrode material powder. This allows the electrostatic electrode 15 to have a coefficient of thermal expansion close to the coefficient of thermal expansion of the alumina sintered body 12 or the yttria sintered body 13. Therefore, adhesion of the base 11 to the electrostatic electrode 15 can be improved. In addition, thermal shrinkage of the printing paste during the subsequent sintering process may be decreased. In this case, it is preferable that the total content of the alumina powder or the yttria powder included in the printing paste is about 5 to about 30 weight %. This allows for the provision of highly increased adhesion without adversely affecting the functions of the electrostatic electrode 15.

Alternatively, the electrostatic electrode 15 may be formed by mounting a bulk of an electrode material or a sheet of an electrode material (foil) on the surface of the alumina sintered body 12 or forming a thin film of an electrode material on the surface of the alumina sintered body 12 through CVD or PVD. It is preferable that the surface of the alumina sintered body 12 on which electrostatic electrode is to be formed is subjected to grinding before formation of the electrostatic electrode 15, thereby providing a smooth surface with a flatness of about 10 μm or less.

Figure 2C:
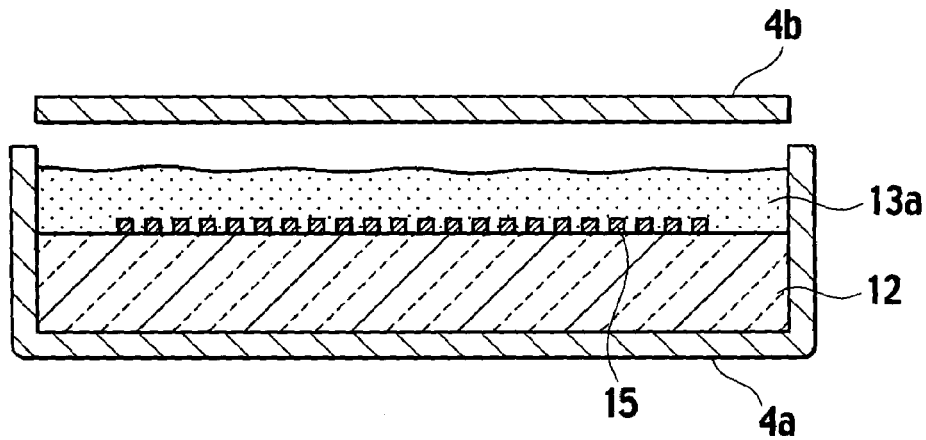

Next, as shown in FIG. 2C, a yttria compact is formed on the electrostatic electrode 15. More specifically, an yttria compact is formed on the alumina sintered body 12 and the electrostatic electrode 15. Furthermore, a binder, water, a dispersing agent, and the like are added to and mixed with a raw powder for the yttria sintered body 13, resulting in a slurry. The raw powder may be yttria powder or a mixed powder made by adding an alumina powder, a silica powder, a zirconia powder, a silicon carbide powder, a silicon nitride powder, or the like as a reinforcing agent or a sintering additive to a yttria powder. Such a mixed powder allows for improvements in mechanical strength such as bending strength or fracture toughness of the yttria sintered body 13. It is preferable that the yttria content included in that raw powder be about 90 weight % or greater. It is more preferable that the yttria content be about 99 weight % or greater. It is also preferable that the purity of the yttria powder be about 99.5 weight % or greater, more preferably about 99.9 weight % or greater.

Moreover, it is preferable that the yttria powder to be used for the raw powder is calcined at about 400° C. or greater. This allows for the elimination of water and carbon in the yttria powder, which otherwise inhibits the sintering of yttria. Therefore, the sintering time for forming the yttria sintered body can be shortened and the sintering temperature for doing the same can be lower. Moreover, it is possible to provide a denser yttria sintered body. As a result, excessive grain growth of the yttria sintered body can be prevented and the mechanical strength of the yttria sintered body can be improved. Furthermore, the yttria sintered body 13 with less tonal unevenness and unremarkable color shading may be provided. It is more preferable that the yttria powder is calcined at a temperature of about 500 to about 1000° C. Furthermore, it is preferable that the yttria powder is calcined in a oxidized atmosphere. Calcining may be applied to granules made of an yttria powder, or to the yttria powder before making the granules.

Furthermore, it is preferable that the water content of the yttria powder to be used for the raw powder is equal to or less than about 1%. This allows for sintering at a lower temperature and for providing a denser yttria sintered body having high mechanical strength. In addition, the oxidation of the electrostatic electrode 15 can be prevented. Furthermore, it is also preferable that the average particle size of the yttria powder or the mixed powder is about 0.1 to about 3.5 µm.

The slurry is granulated through spray drier or the like, resulting in granules 13a. A metal mold including a container 4a and a lid 4b is prepared. The alumina sintered body 12 on which the electrostatic electrode 15 is formed is put in the container 4a of the metal mold. The granules 13a are filled on the alumina sintered body 12 and the electrostatic electrode 15. The lid 4b presses the granules 13a from above, and an yttria compact is then formed through mold pressing. At the same time, the alumina sintered body 12, the electrostatic electrode 15, and the yttria compact are integrated.

It is preferable that the density of the yttria compact is equal to or less about 2 g/cc. In the case of liquid-phase sintered ceramics, even if cracks occur when temperature rises during the sintering process, eliminating those cracks through subsequent liquid-phase sintering is possible. In contrast, in the case of solid-phase sintered yttria, even if cracks occur due to shrinkage when temperature rises during the sintering process, in other words, even if cracks occur before solid-phase sintering, eliminating those cracks through the subsequent solid-phase sintering is impossible. A yttria compact having a density of about 2 g/cc or less is capable of preventing cracks by offsetting a thermal stress occurred when temperature rises during the sintering process and a difference in shrinkage between the outer region and the central region. As a result, a dense yttria sintered body 13 without cracks may be provided. Therefore, the mechanical strength of the electrostatic chuck 10 can be improved.

Setting the compacting pressure for forming a yttria compact to, for example, about 50 kg/cm$^2$ or less allows the density of the yttria compact to be about 2 g/cc or less. This is an extremely low compacting pressure as compared to a typically used compacting pressure of 200 kg/cm$^2$. The compacting pressure applied when forming the yttria compact is more preferably about 10 to about 50 kg/cm$^2$. This can provide a compact having strength for handling. Alternatively, the alumina sintered body 12, the electrostatic electrode 15, and the yttria compact may be integrated by forming from granules through mold pressing, CIP, slip casting, or the like, mounting the yttria compact on the alumina sintered body 12 and the electrostatic electrode 15 and then pressing them.

Figure 2D:
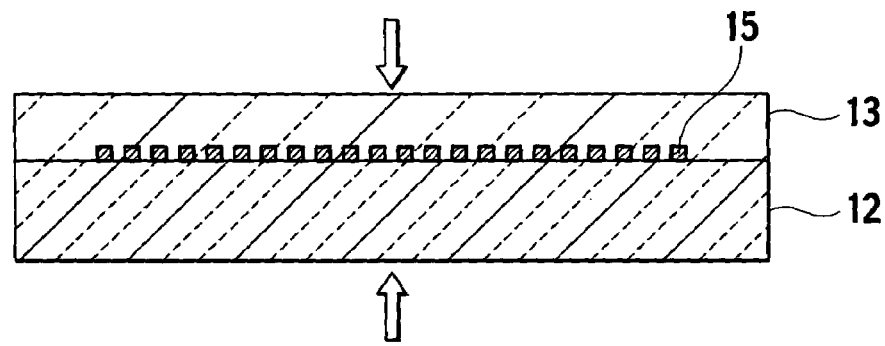

Next, as shown in FIG. 2D, the alumina sintered body 12, the electrostatic electrode 15, and the yttria compact are integrated by sintering. More specifically, the alumina sintered body 12, the electrostatic electrode 15, and the yttria compact are integrated by hot pressing into an integrated sintered body including the alumina sintered body 12, the electrostatic electrode 15, and the yttria sintered body 13. The process of forming the yttria sintered body 13 is conducted over multiple sub-steps. A part of the forming process of the yttria sintered body 13 and integrating process are conducted at the same time.

Sintering may be conducted in an inactive gas such as nitrogen gas or argon gas while applying pressure in a uniaxial direction, for example, as shown in FIG. 2D. It is preferable that the sintering temperature for forming the integrated sintered body and for sintering the yttria compact is about 1400 to about 1800° C. It is more preferable that the sintering temperature for forming the integrated sintered body is about 1400 to about 1600° C. As such, sintering at a low temperature to form the integrated sintered body prevents excessive grain grown of the alumina sintered body 12 and the yttria sintered body 13 and allows increase in the mechanical strength of the alumina sintered body 12 and the yttria sintered body 13.

For shortening the sintering time, it is preferable that the temperature rising rate is about 500 to about 1000° C./hour at a temperature of about 1000° C. or less, at which temperature densification does not begin, and about 100 to about 300° C./hour for higher temperatures. It is also preferable that the applied pressure is about 50 to about 300 kg/cm$^2$. This can provide a denser yttria sintered body 13. It is more preferable that the applied pressure is about 100 to about 200 kg/cm$^2$. When using yttria powder that has not been calcined at a temperature of about 400° C. or greater as a raw powder of the yttria sintered body 13, it may be held at temperatures ranging between about 400 and about 1000° C. during a temperature raising process.

Figure 2E:
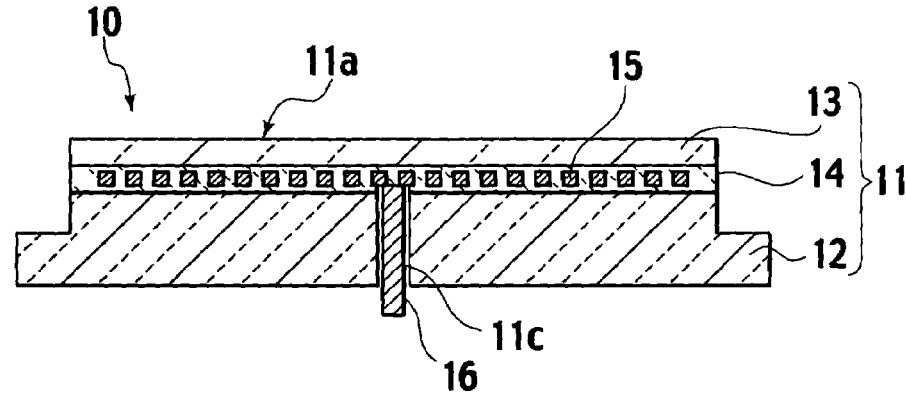

Lastly, the integrated sintered body is processed and then joined with the terminal 16, resulting in an electrostatic chuck 10 having electrostatic electrode 15 buried in the base 11, as shown in FIG. 2E. More specifically, the yttria sintered body 13, which is a dielectric layer, is ground to be about 0.3 to about 0.5 mm thick. The center line average surface roughness (Ra) of the substrate mounting surface 11a is adjusted to be equal to or less than about 0.6 µm by lapping and/or polishing. A hole 11c for insertion of the terminal 16 is formed in the base 11 by drilling. Afterwards, the terminal 16 is inserted into the hole 11c, and the electrostatic electrode 15 is then connected to the terminal 16 by brazing or welding. In this manner, the alumina sintered body 12, the electrostatic electrode 15, and the yttria sintered body 13 are all integrated by sintering, thereby providing the electrostatic chuck 10 having an intermediate layer 14 formed between the alumina sintered body 12 and the yttria sintered body 13.

Note that: instead of the alumina sintered body 12 shown in FIGS. 2A to 2D, an alumina presintered body may be formed; the electrostatic electrode 15 may be formed on the alumina presintered body; the yttria compact may be formed on the alumina presintered body and the electrostatic electrode 15; and the alumina presintered body, the electrostatic electrode 15, and the yttria compact may then be sintered into an integrated sintered body. In this case, the alumina presintered body may be sintered at a lower temperature than that for sintering the alumina sintered body 12 or with a shorter sintering time than that for sintering the alumina sintered body 12.

According to the manufacturing method shown in FIGS. 2A to 2D, formation of electrostatic electrode 15 on the alumina sintered body 12 or the alumina presintered body allows for the prevention of deformation or displacement of the electrostatic electrode 15 due to sintering shrinkage. Therefore, the flatness of the electrostatic electrode 15 can be improved. As a result, the characteristics of the electrostatic chuck 10 can be improved. More specifically, since the distance from the electrostatic electrode 15 to the substrate mounting surface 11a, i.e., the thickness of the dielectric layer can be uniform, the electrostatic chuck 10 can provide a uniform chucking force over the substrate mounting surface 11a. As a result, this provides for a uniform temperature distribution of a substrate during a semiconductor manufacturing process.

Moreover, sintering through hot pressing into an integrated sintered body allows for the joining the alumina sintered body 12 with the yttria sintered body 13 without using an adhesive or the like, and also with practically no joining interface therebetween. Therefore, the electrostatic electrode 15 may be blocked from the external atmosphere and corrosion resistance of the electrostatic chuck 10 can be improved. The electrostatic chuck 10 having the alumina sintered body 12, the yttria sintered body 13, and the electrostatic electrode 15 tightly joined together can be provided.

Furthermore, a dense alumina sintered body 12 and a dense yttria sintered body 13 may be provided and the dielectric strength or the like can be improved. Sintering yttria, which has sintering resistance by hot pressing allows for the provision of the yttria sintered body 13 with high volume resistivity required for the electrostatic chuck 10 using Coulombic force. Therefore, dechucking response and chucking force of the electrostatic chuck 10 can be improved.

Figure 3A:
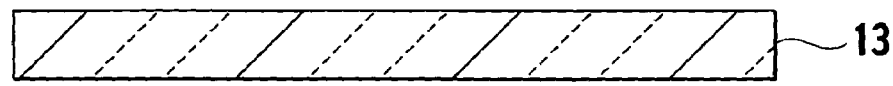
FIGS. 3A through 3E show a manufacturing method for the electrostatic chuck according to an embodiment of the present invention.

Alternatively, the electrostatic chuck 10 may be manufactured using the manufacturing method shown in FIGS. 3A to 3E. First, as shown in FIG. 3A, the yttria sintered body 13 is formed. More specifically, in the same manner as shown in FIG. 2C, a raw powder for the yttria sintered body 13 is prepared, and granules are then formed. Afterwards, a yttria compact having a disc-shape or the like is formed from the granules by mold pressing, cold isostatic pressing (CIP), slip casting, or the like. At this time, it is preferable that the density of the yttria compact is adjusted in the same manner as shown in FIG. 2C.

Sintering the yttria compact in an inactive gas such as nitrogen gas or argon gas by hot pressing allows for the formation of the yttria sintered body 13. Alternatively, sintering the yttria compact in an oxidized atmosphere by atmospheric sintering may allow for the formation of the yttria sintered body 13. It is preferable that the sintering temperature of the yttria compact is about 1400 to about 1800° C., more preferably about 1400 to about 1600° C. Sintering the yttria compact at a low temperature in such a manner allows for the prevention of excessive grain growth of the yttria sintered body 13, and an increase in the mechanical strength of the yttria sintered body 13. Note that when using yttria powder that has not been calcined at a temperature of about 400° C. or greater as a raw powder for the yttria sintered body 13, it may be held at temperatures ranging between about 400 and about 1000° C. during the temperature raising process.

Figure 3B:
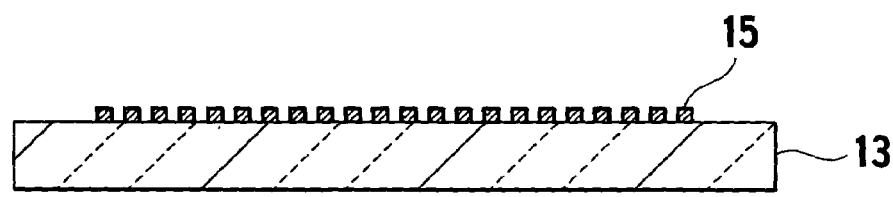
Figure 3C:
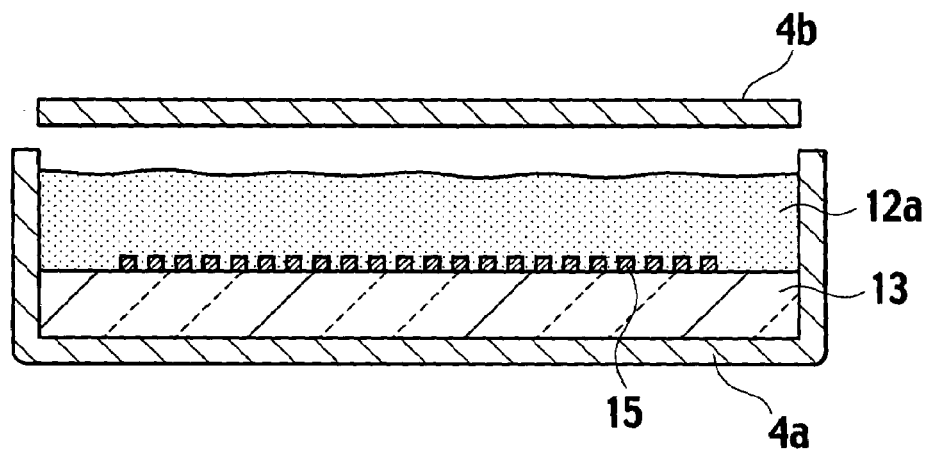

Next, as shown in FIG. 3B, the electrostatic electrode 15 is formed on the yttria sintered body 13 in the same manner as shown in FIG. 2B. Afterwards, as shown in FIG. 3C, an alumina compact is formed on the electrostatic electrode 15. Specifically, an alumina compact is formed on the yttria sintered body 13 and the electrostatic electrode 15. More specifically, a raw powder for the alumina sintered body 12 is prepared and granules 12*a* are then formed in the same manner as shown in FIG. 2A. The yttria sintered body 13 having electrostatic electrode 15 is put in the container 4*a* of the metal mold. The granules 12*a* are filled on the yttria sintered body 13 and the electrostatic electrode 15. The granules 12*a* are then pressed from above using the lid 4*b,* thereby forming an alumina compact by mold pressing. At the same time, the yttria sintered body 13, the electrostatic electrode 15, and the alumina compact are integrated. Alternatively, the alumina compact may be formed from the granules, mounted on the yttria sintered body 13 and electrostatic electrode 15, and then pressed. In this manner, the yttria sintered body 13, the electrostatic electrode 15, and the alumina compact are integrated.

Figure 3D:
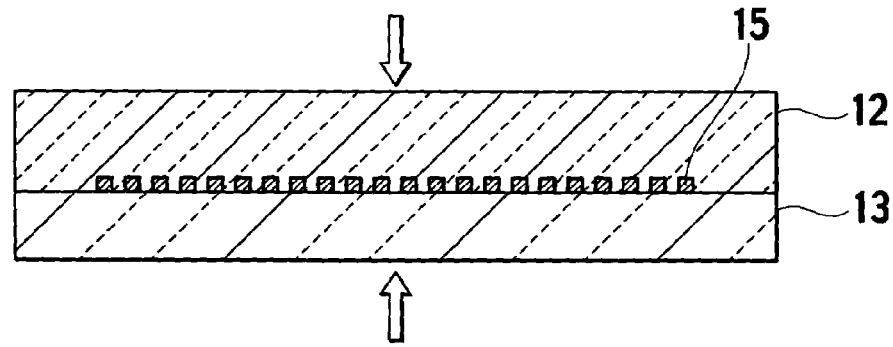

Next, as shown in FIG. 3D, the yttria sintered body 13, the electrostatic electrode 15, and the alumina compact are sintered into an integrated sintered body. Specifically, the yttria sintered body 13, the electrostatic electrode 15, and the alumina compact are sintered by hot pressing, resulting in an integrated sintered body including the yttria sintered body 13, the electrostatic electrode 15, and the alumina sintered body 12. In this manner, the manufacturing process for the alumina sintered body 12 is conducted over multiple sub-steps, and a part of the manufacturing process for the alumina sintered body 12 and integrating process are conducted at the same time. For example, as shown in FIG. 3D, sintering in an inactive gas such as nitrogen gas or argon gas while applying pressure in a uniaxial direction is possible. It is preferable that the temperature for sintering an integrated sintered body and also for sintering an alumina compact is about 1400 to about 1700° C. It is more preferable that the temperature for sintering an integrated sintered body is about 1400 to about 1600° C. Sintering at a low temperature in this manner into an integrated sintered body allows for the prevention of excessive grain growth of the alumina sintered body 12 and the yttria sintered body 13, and the increase in the mechanical strength of the alumina sintered body 12 and the yttria sintered body 13. The temperature rising rate and the pressure applied while sintering may be the same as described above with respect to FIG. 2D.

Figure 3E:
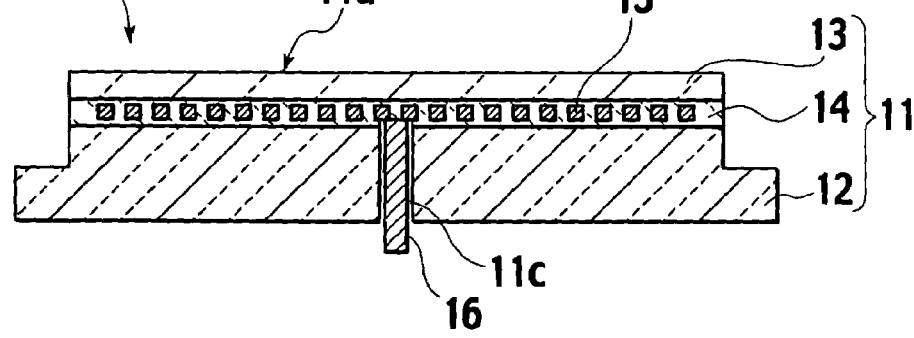

Lastly, the integrated sintered body is processed and joined with the terminal 16, thereby providing the electrostatic chuck 10 having the electrostatic electrode 15 buried in the base 11, as shown in FIG. 3E, which is similar to that described above with respect to FIG. 2E.

Note that: instead of the yttria sintered body 13 in FIGS. 3A to 3D, a presintered yttria body may be formed; the electrostatic electrode 15 may be formed on the yttria presintered body; an alumina compact may be formed on the yttria presintered body and the electrostatic electrode 15; and the yttria presintered body, the electrostatic electrode 15, and the alumina compact may then be sintered into an integrated sintered body. At this time, the yttria presintered body may be formed by sintering at a lower sintering temperature than that for forming the yttria sintered body 13 in a shorter sintering time than that for forming the yttria sintered body 13.

According to the manufacturing method shown in FIGS. 3A to 3E, forming the electrostatic electrode 15 on the yttria sintered body 13 or the yttria presintered body allows for the prevention of deformation or displacement of the electrostatic electrode 15 due to sintering shrinkage. As a result, flatness of the electrostatic electrode 15 is improved and characteristic of the electrostatic chuck 10 is also improved.

Alternatively, the electrostatic chuck 10 may be manufactured by forming a layered body including the alumina compact, the electrostatic electrode 15, and the yttria compact, and then sintering it by hot pressing into an integrated sintered body. In the case of burying the electrostatic electrode 15 in the alumina sintered body 12 or the yttria sintered body 13, an alumina compact or an yttria compact in which electrostatic electrode 15 is buried can be formed.

As described above, according to the electrostatic chuck 10 of this embodiment, a part to be exposed to a corrosive gas is formed by the yttria sintered body 13. Moreover, the electrostatic electrode 15 is buried in the base 11. Therefore, the electrostatic chuck 10 has high corrosion resistance. Furthermore, a part of the base 11 is formed by the alumina sintered body 12 having high mechanical strength. Furthermore, since the alumina sintered body 12 and the yttria sintered body 13 have almost the same coefficient of thermal expansion, they are tightly joined together, resulting in the electrostatic chuck 10 having high mechanical strength.

Therefore, the electrostatic chuck 10 is sufficiently capable of enduring in-situ cleaning. This prevents corrosion of the substrate mounting surface and corresponding change in its state from adversely affecting the characteristic of the electrostatic chuck such as the chucking force or thermal uniformity. Furthermore, the electrostatic chuck 10 is strong enough to tolerate thermal stress or the like. Since bending strength of the yttria sintered body 13 is approximately 200 MPa and fracture toughness thereof is approximately 1.0 $MN/m^{3/2}$ i.e., brittle, an electrostatic chuck made of only the yttria sintered body may allow cracks or chipping while processing, or may bring about breakage due to thermal stress while brazing the terminal and the electrostatic electrode together. However, according to the electrostatic chuck 10, the alumina sintered body 12 may ensure mechanical strength while the yttria sintered body 13 may ensure corrosion resistance.

Other Embodiments

Electrostatic Chuck

A ceramic member such as the electrostatic chuck 10 may comprise a connecting member connects the metallic member and the terminal. The connecting member may be buried in the base and joined with the metallic member and the terminal. A ceramic member including such a connecting member is explained forthwith by exemplifying an electrostatic chuck 20 shown in FIGS. 4A and 4B. Substantially the same parts as in the electrostatic chuck 10 of FIGS. 1A and 1B are attached with the same reference numerals, respectively, and explanations thereof are omitted.

Figure 4A:
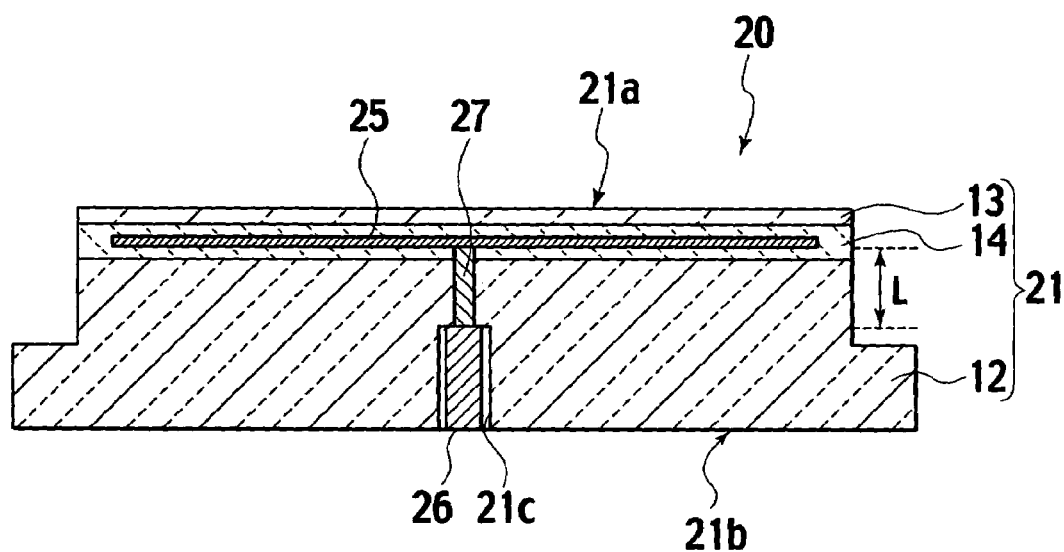
FIG. 4A is a sectional view taken along a line 2a-2a of an electrostatic chuck having a buried connecting member according to an embodiment of the present invention.
Figure 4B:
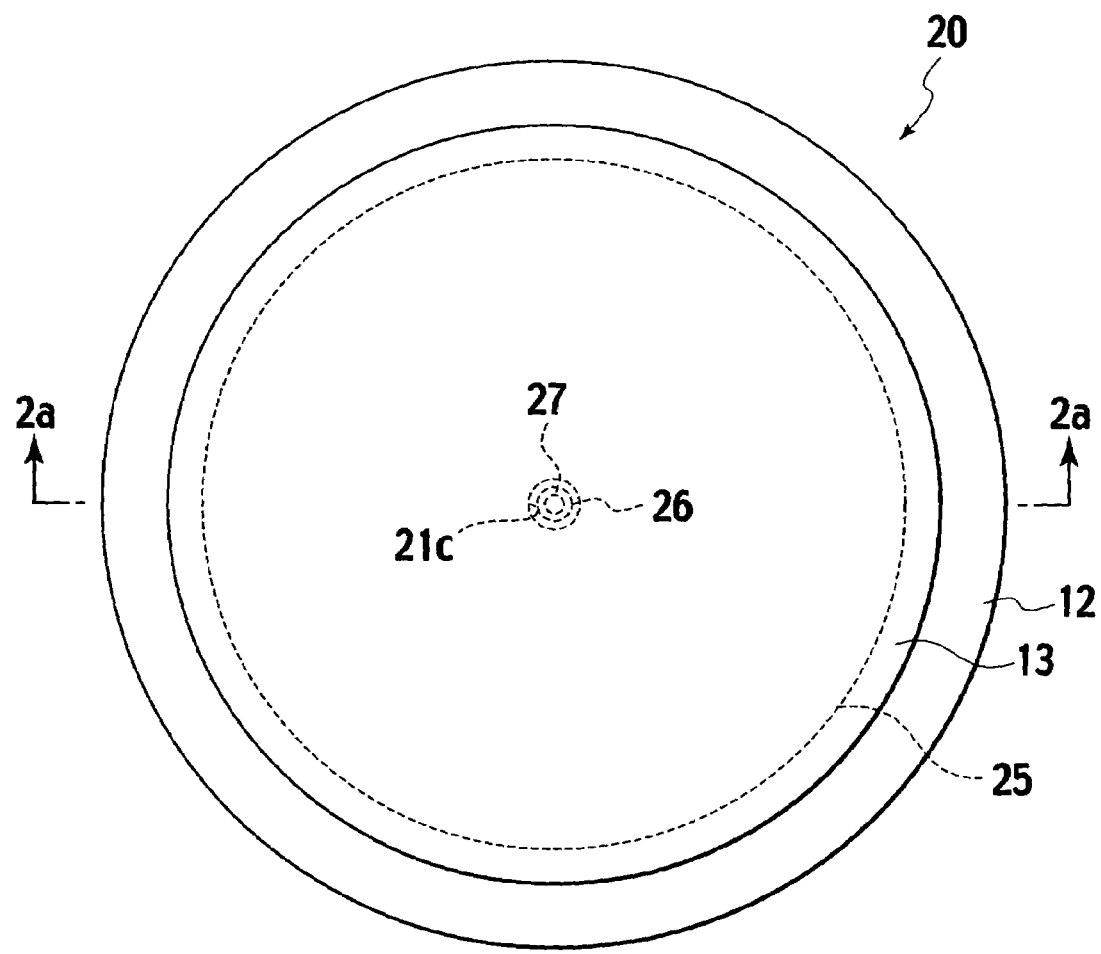
FIG. 4B is a plan view thereof.

As shown in FIGS. 4A and 4B, the electrostatic chuck 20 comprises a base 21, an electrostatic electrode 25, a terminal 26, and a connecting member 27. The electrostatic electrode 25 and the connecting member 27 are buried in the base 21. The base 21 comprises an alumina sintered body 12, an yttria sintered body 13, and an intermediate layer 14 including yttrium and aluminum.

The connecting member 27 is buried in the base 21. Specifically, the connecting member 27 is buried in a lower layer than the electrostatic electrode 25 of the base 21. For example, the connecting member 27 is buried in the alumina sintered body 12. The connecting member 27 is joined with the electrostatic electrode 25 and the terminal 26, thereby connecting the electrostatic electrode 25 to the terminal 26.

It is preferable that the connecting member 27 is made of the same refractory material as the electrostatic electrode 25. It is also preferable that a difference between the coefficient of thermal expansion of the connecting member 27 and the alumina sintered body 12 is equal to or less than about $2\times10^{-6}/K$. This allows for the prevention of cracks due to the connecting member 27 being buried in the base 21. It is particularly preferable that the connecting member 27 includes at least one of platinum or niobium. Materials such as platinum, niobium, and alloys of a variety of metals with platinum and niobium have a very close coefficient of thermal expansion to the alumina sintered body 12. This allows for the coefficient of thermal expansion of the connecting member 27 to be close to that of the base 21, thereby preventing cracks due to the connecting member 27 being buried in the base 21.

The shape of the connecting member 27 is not limited. Alternatively, other than the column shape shown in FIGS. 4A and 4B, the connecting member may be rectangular column shaped, tubular, disc shaped, spherical shaped, or the like. It is preferable that a distance L between the joint surface of the connecting member 27 and the electrostatic electrode 25 and the joint surface of the connecting member 27 and the terminal 26 (i.e., length of the connecting member 127) is equal to or greater than about 1 mm. This provides appropriate reinforcement of the electrostatic chuck 20 and improvement in the mechanical strength. It is more preferable that the distance L is equal to or greater than about 2 mm. Moreover, it is preferable that when the connecting member 27 is column shaped, tubular, disc shaped, or spherical shape, the diameter is equal to or greater than about 1.0 mm, and that when it is rectangular column shaped, the width is equal to or greater than about 1.0 mm. It is more preferable that the diameter of the connecting member 27 is about 2 to about 3 mm, and the width is about 2 to about 3 mm.

The connecting member 27 and the electrostatic electrode 25 are formed in abutting contact with each other, and may be joined by applying a pressure while sintering (thermocompression) by hot pressing or the like. At this time, an adhesive may be applied between the connecting member 27 and the electrostatic electrode 25.

A hole 21c is formed in the back side 21b of the base 21, allowing insertion of the terminal 26. The hole 21c extends from the back side 21b to the connecting member 27, and a part of the connecting member 27 is exposed. The terminal 26 is then inserted into the hole 21c, and joined with the exposed part of the connecting member 27. The connecting member 27 and the terminal 26 may be joined by brazing or welding, for example.

A composite brazing material, which is a composite material made from a metal and ceramics, may be used as a brazing material. For example, indium (In), gold (Au), silver (Ag), aluminum (Al), nickel (Ni), or an aluminum—alumina composite material (aluminium—alumina composite brazing material) may be used as the brazing material. Moreover, an alloy including at least two metals selected from a group of indium, gold, silver, aluminum, nickel, and titanium may be used as the brazing material. For example, a gold-nickel alloy or the like may be used. Brazing may be conducted by placing the brazing material between the connecting member 27 and the terminal 26 and then heating at a temperature allowing the brazing material to melt. Alternatively, the connecting member 27 may have a concave part that allows for the insertion of the terminal 26. In this case, the terminal 26 is inserted into the concave part of the connecting member 27 and thereby joined therewith.

It is preferable that the alumina sintered body 12, the electrostatic electrode 25, the connecting member 27, and the yttria sintered body 13 are sintered into an integrated sintered body. This can join them tightly together. It is particularly preferable that the integrated sintered body is formed by hot pressing.

According to such a connecting member 27, part of the base 21, which weakens in strength due to the hole 21c for insertion of the terminal 26, is reinforced by the buried connecting member 27. Therefore, the mechanical strength of the electrostatic chuck 20 can be improved. Moreover, the distance between the hole 21c formed in the base 21 and the substrate mounting surface 21a may be longer by the length of the connecting member 27. Therefore, even when the distance between the electrostatic electrode 25 and the substrate mounting surface 21a is short in the case where the electrostatic chuck 20 is a type based on Coulombic force, namely, even when the dielectric layer is thin, the strength of the electrostatic chuck 20 does not deteriorate due to formation of the hole 21c. Aside from the points described above, the base 21 and the electrostatic electrode 25 are substantially the same as the base 11 and the electrostatic electrode 15 shown in FIGS. 1A, 1B, respectively. Such an electrostatic chuck 20 may be manufactured in the following manner as an example. According to the manufacturing method shown in FIGS. 3A to 3E, once an electrostatic electrode 25 is formed on the yttria sintered body 13 or the yttria presintered body, the electrostatic electrode 25 and the connecting member 27 are arranged in contact with each other. An alumina compact is then formed on the yttria sintered body or the yttria presintered body, the electrostatic electrode 25, and the connecting member 27, and then they are sintered by hot pressing or the like into an integrated sintered body. As a result, the electrostatic electrode 25 and the connecting member 27 are joined together, providing the base in which the connecting member 27 is buried.

At this time, an adhesive may intervene between the connecting member 27 and the electrostatic electrode 25. The adhesive may be a printing paste for forming an electrostatic electrode 25, or an organic adhesive, etc. The electrostatic electrode 25 may be formed on the yttria sintered body or the yttria presintered body by for example, screen printing. And a target position at which the connecting member 27 is to be formed is determined using a perforated jig for positioning or the like. The connecting member 27 is joined at the determined target position on the electrostatic electrode 25 using the printing paste as an adhesive.

Afterwards, the hole 21c is formed in the base 21, extending until a position allowing the connecting member 27 to be exposed. The terminal 26 is then inserted into the hole 21c, and the terminal 26 and the connecting member 27 are joined together by brazing or welding. Aside from this, the electrostatic chuck 20 may be manufactured in the same manner as the electrostatic chuck 10.

Heater

The ceramic member includes a heater having a resistance heating element as metallic member as well as an electrostatic chuck. A heater 30 is explained using FIGS. 5A and 5B. Substantially the same parts as those in the electrostatic chuck 10 shown in FIGS. 1A and 1B are attached with the same reference numerals, respectively, and explanations thereof are omitted.

The heater 30 comprises a base 31, resistance heating element 35, and a terminal 36. The base 31 has a substrate mounting surface 31a and heats a substrate such as a semiconductor substrate or a liquid crystal substrate mounted on the substrate mounting surface 31a. The resistance heating element 35 is buried in the base 31. The base 31 comprises an alumina sintered body 12, an yttria sintered body 13, and an intermediate layer 34 including yttrium and aluminum. It is preferable that the center line average surface roughness (Ra) on the substrate mounting surface 31a of the base 31 is equal to or less than about 1.6 µm. According to this structure, the substrate mounting surface 31a and the substrate are appropriately in contact with each other, thereby keeping the substrate temperature distribution uniform and preventing generation of particles due to friction of the substrate mounting surface 31a.

Figure 5A:
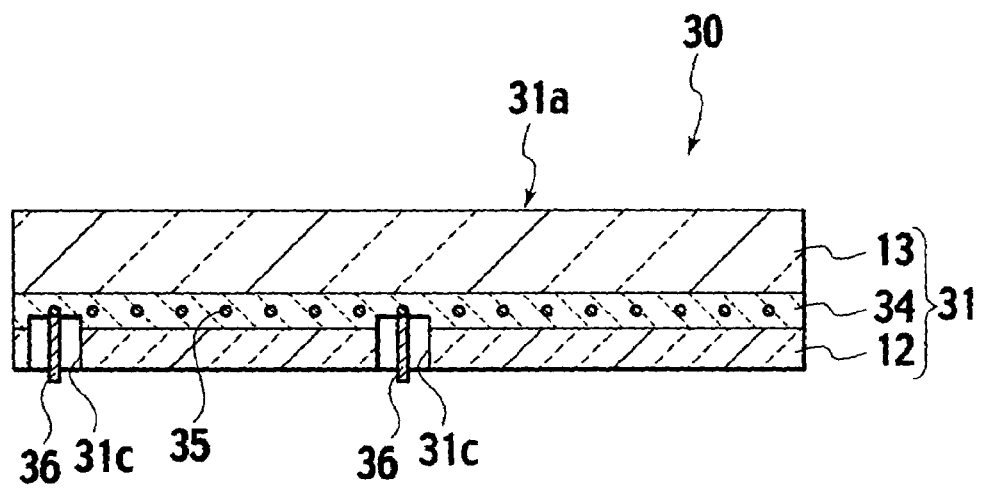
FIG. 5A is a cross sectional view taken along a line 3a-3a of a heater according to an embodiment of the present invention.
Figure 5B:
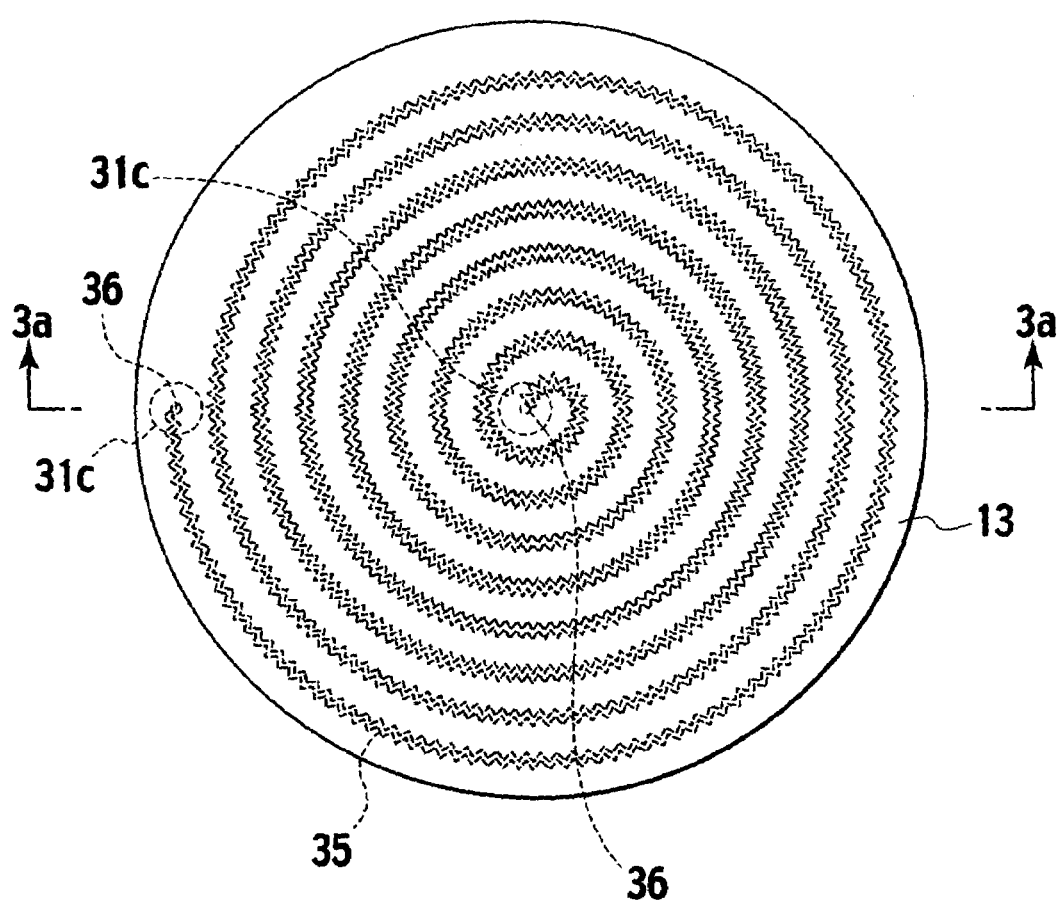
FIG. 5B is a plan view thereof.

The resistance heating element 35 is metallic member buried in the base 31. The resistance heating element 35 are supplied with electric power, generating heat and thereby heating the substrate mounted on the substrate mounting surface 31a. It is preferable that the resistance heating element 35 intervene between the alumina sintered body 12 and the yttria sintered body 13, as shown in FIGS. 5A and 5B. In this case, the resistance heating element 35 is only necessary to intervene between the alumina sintered body 12 and the yttria sintered body 13. For example, as shown in FIGS. 5A and 5B, the resistance heating element 35 may be positioned within the intermediate layer 34 between the alumina sintered body 12 and the yttria sintered body 13, and may be in contact with the alumina sintered body 12 and the yttria sintered body 13. Note that the resistance heating element 35 may be buried within the alumina sintered body 12 or the yttria sintered body 13. In this case, the yttria sintered body 13 is formed on the alumina sintered body 12 via an intermediate layer without making the resistance heating elements 35 intervene therebetween.

The resistance heating element 35 may be made of the same material as the electrostatic electrode 15. The material making the resistance heating element 35 is not limited. For example, a printed printing paste including a heating element material powder, a linear, coil-shaped, or band-shaped bulk of heating element material, a linear, coil-shaped, or band-shaped sheet (foil) heating element material, or a thin film deposited by CVD or PVD may be used.

The shape of the resistance heating elements 35 is not particularly limited. It may be spiral, mesh (metallic mesh), perforated (punching metal), or shape having multiple folds. The resistance heating element 35 may be a one or divided into multiple parts. For example, resistance heating element may have a central region and a peripheral region provided by dividing the substrate mounting surface 31a.

Components included in the alumina sintered body 12 and the yttria sintered body 13 may diffuse via gaps of the resistance heating element 35 and through a periphery of the resistance heating element 35 during a manufacturing process for a heater 30. As a result, an intermediate layer 34 is formed in the periphery of the resistance heating element 35 and covers the resistance heating element 35. Aside from this, the intermediate layer 34 is substantially the same as the intermediate layer 14 shown in FIG. 1A. In this case, the resistance heating element 35 are positioned within the intermediate layer 34 between the alumina sintered body 12 and the yttria sintered body 13, as shown in 5A.

The terminal 36 is joined with the resistance heating element 35 so as to connect it to a power supply member. The terminal 36 is inserted into a hole 31c of the base 31. The resistance heating element 35 are joined with the terminal 36 by, for example, brazing or welding.

As with the electrostatic chuck 10, it is preferable that the alumina sintered body 12, the yttria sintered body 13, and the resistance heating element 35 are sintered into an integrated sintered body. It is particularly preferable that they are sintered into an integrated sintered body by hot pressing.

Such a heater 30 may be manufactured by replacing the electrostatic electrode 15 with the resistance heating element 35 using the manufacturing method for the electrostatic chuck 10 described using FIGS. 2A to 2E and FIGS. 3A to 3E. In particular, forming the resistance heating element 35 on the alumina sintered body 12 or the alumina presintered body, or on the yttria sintered body 13 or the yttria presintered body allows for the prevention of deformation or displacement of the resistance heating element 35 due to sintering shrinkage. As a result, the temperature distribution of the heater 30 may attain a predetermined target design.

According to the heater 30 of the embodiment, almost the same results as with the electrostatic chuck 10 may be provided. Therefore, it is possible to prevent a change in the state of the substrate mounting surface due to corrosion thereof and to also prevent that change from influencing the thermal uniformity thereof. As a result, the heater 30 having high thermal uniformity can be provided.

Note that a connecting member 27 shown in FIGS. 4A and 4B may be applied to the heater 30. More specifically, a connecting member, which is joined with the resistance heating element 35 and the terminal 36 and connects the resistance heating elements 35 to the terminal 36 can be buried in the base 31.

Susceptor

The ceramic member includes a susceptor having a radio frequency (RF) electrode as a metallic member as well as an electrostatic chuck and a heater. A susceptor 40 capable of heating is explained using FIG. 6. Substantially the same parts as those in the electrostatic chucks 10 and 20 and the heater 30 shown in FIGS. 1A and 1B, FIGS. 4A and 4B, and FIGS. 5A and 5B are attached with the same reference numerals, respectively, and explanations thereof are omitted.

The susceptor 40 comprises a base 41, and RF electrode 45, and a terminal 46. In addition, the susceptor 40 further comprises the same resistance heating element 35 and terminal 36 as those in the heater shown in FIGS. 5A and 5B so that the susceptor 40 can heat. The base 41 has a substrate mounting surface 41a and holds a substrate such as a semiconductor substrate or a liquid crystal substrate mounted on the substrate mounting surface 41a. The RF electrode 45 and the resistance heating element 35 are buried in the base 41. The base 41 comprises an alumina sintered body 12, an yttria sintered body 13, and an intermediate layer 14 including yttrium and aluminum. Aside from this, the base 41 is almost the same as the base 31 shown in FIG. 5.

The RF electrode 45 is a metallic member buried in the base 41. The RF electrode 45 is supplied with electric power and excites a reactive gas. The RF electrode 45 is capable of exciting a reactive gas such as a halogen corrosive gas or a gas for forming an insulating film used for etching or plasma CVD.

Figure 6:
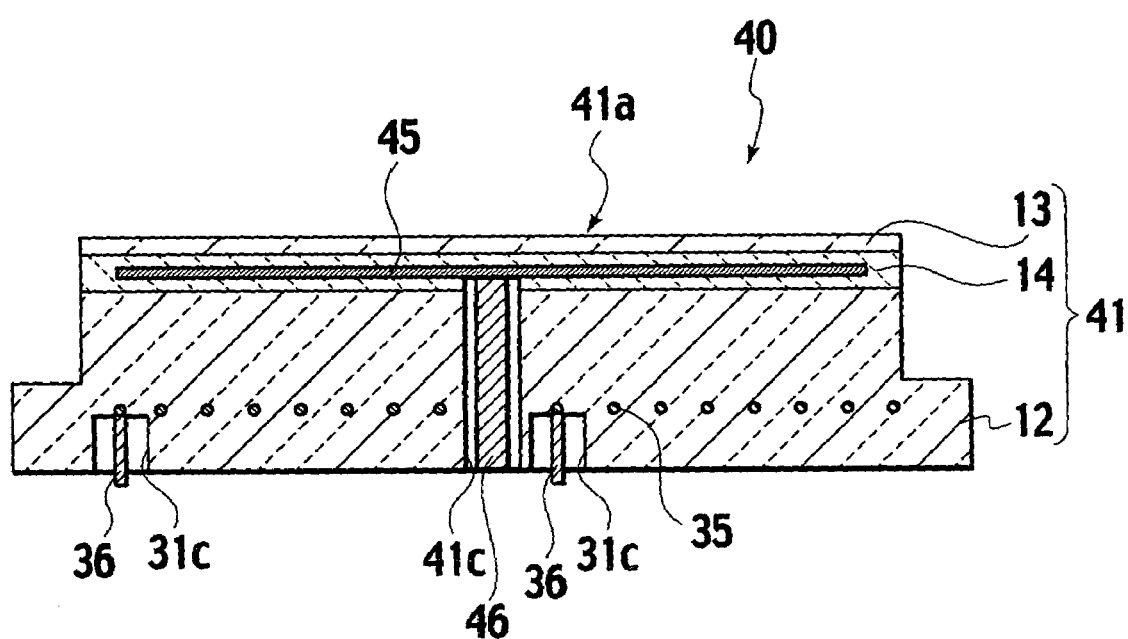
FIG. 6 is a cross sectional view of a susceptor according to an embodiment of the present invention.

It is preferable as shown in FIG. 6 that the RF electrode 45 intervenes between the alumina sintered body 12 and the yttria sintered body 13. In this case, the RF electrode 45 is only necessary to intervene between the alumina sintered body 12 and the yttria sintered body 13. The RF electrode 45 may be positioned within the intermediate layer 14 between the alumina sintered body 12 and the yttria sintered body 13, as shown in FIG. 6, for example, or may be in contact with the alumina sintered body 12 and the yttria sintered body 13. Note that the RF electrode 45 may be buried in the alumina sintered body 12 or the yttria sintered body 13. In this case, the yttria sintered body 13 is formed on the alumnina sintered body 12 via an intermediate layer without making the RF electrode 45 intervene therebetween.

The RF electrode 45 may be the same as the electrostatic electrode 15 of the electrostatic chuck 10. It is preferable that the flatness of the RF electrode 45 is about 200 μm or less, more preferably about 100 μm or less. This can generate uniform plasma. The terminal 46 for connecting to a power supply material is joined with the RF electrode 45. The terminal 46 is inserted into a hole 41c of the base 41. The RF electrode 45 and the terminal 46 are joined together by, for example, brazing or welding. The resistance heating element 35 is buried in the alumina sintered body 12.

It is preferable that the alumina sintered body 12, the yttria sintered body 13, the RF electrode 45, and the resistance heating element 35 are sintered into an integrated sintered body as with the case of the electrostatic chuck 10 and the heater 30. It is particularly preferable that they are sintered by hot pressing into an integrated sintered body.

Such a susceptor may be manufactured by replacing the electrostatic electrode 15 with the RF electrode 45 in the process according to the manufacturing method for the electrostatic chuck 10 shown in FIGS. 2A to 2E and 3A to 3E, and forming an alumina compact in which the resistance heating element 35 is buried in the process of forming the alumina sintered body or the alumina presintered body.

Forming the RF electrode 45 on the alumina sintered body 12 or the alumina presintered body or on the yttria sintered body 13 or the yttria presintered body particularly allows for the prevention of deformation or displacement of the RF electrode 45 due to sintering shrinkage. Consequently, the flatness of the RF electrode 45 and the characteristic of the susceptor 40 may be improved. More specifically, a uniform distance between the RF electrode 45 and the substrate mounting surface 41a can be provided. This allows the RF electrode 45 to generate uniform plasma. As a result, a uniform temperature distribution of a substrate may be provided during the semiconductor manufacturing process, and the thermal uniformity thereof may be improved.

According to the susceptor of this embodiment, almost the same results as those of the electrostatic chuck 10 and the heater 30 may be provided.

Note that the connecting member 27 shown in FIGS. 4A and 4B may be applied to the susceptor 40. In other words, a connecting member, which is joined with the RF electrode 45 and the terminal 46 and connects the RF electrode 45 to the terminal 46, can be buried in the base 41.

Although the inventions have been described above by reference to certain embodiments of the inventions, the inventions are not limited to the embodiments described above. Modifications and variations of the embodiments described above will occur to those skilled in the art, in light of the above teachings.

For example, the susceptor 40 capable of heating is shown in FIG. 6. Alternatively, it may be a susceptor not having resistance heating element. Moreover, an electrostatic chuck capable of heating may be manufactured by burying the resistance heating element 35 in the base 11 of the electrostatic chuck 10 shown in FIGS. 1A and 1B as with the susceptor 40 shown in FIG. 6. Furthermore, the alumina sintered body 12 and the yttria sintered body 13 may be joined using an adhesive, for example.

EXAMPLES

The present invention is described in detail forthwith based on working examples, however, it is not limited thereto.

Working Example 1

Yttria powder having a purity of 99.9 weight % and an average particle size of 1 μm is prepared as a raw powder for a yttria sintered body. Water, a dispersant, and polyvinyl alcohol (PVA) as a binder are added to the yttria powder and then mixed for 16 hours using a trommel, resulting in a slurry. The resulting slurry is sifted through a 20 μm sieve, removing impurities, and then subjected to spray drying using a spray drier, resulting in yttria granules having an average particle diameter of approximately 80 μm. The resulting granules are calcined in a furnace, which is atmospheric pressure and oxidized atmosphere at a temperature of 500° C. According to this calcining, degreasing and adjusting of the water content to be about 1% or less are conducted.

The yttria granules are filled in a metal mold. A pressure of 10 kg/cm$^2$ is then applied thereupon by a uniaxial pressing apparatus, resulting in an yttria compact. At this time, the density of the yttria compact is adjusted to be 1.8 g/cc. The yttria compact is filled in a carbon mold and then subjected to sintering by hot pressing, resulting in a yttria sintered body. More specifically, while applying a pressure of 100 kg/cm$^2$, sintering is conducted in a pressured nitrogen atmosphere (nitrogen, 150 kPa). Sintering is conducted with a temperature profile of raising temperature from room temperature to 500° C. at a rate of 500° C. to 1000° C. at a rate of 500° C./hour, raising the temperature from 1000° C. to 1600° C. at a rate of 200° C./hour, and then maintaining the temperature at 1600° C. for 4 hours.

Next, ethyl cellulose is mixed as a binder with a mixed powder of about 80 weight % tungsten carbide and 20 weight % alumina powder, resulting in a printing paste. The surface of the yttria sintered body on which an electrostatic electrode will be formed is subjected to grinding, resulting in a smooth surface having a flatness of 10 μm or less. A 20-μm thick electrostatic electrode having a diameter of 290 mm is formed on the smooth surface of the yttria sintered body by screen printing using the printing paste and then dried.

Afterwards, alumina powder having a purity of 99.9 weight % and an average particle size of 0.5 μm is prepared as a raw powder for an alumina sintered body. Water, a dispersant, and polyvinyl alcohol (PVA) as a binder are added to the alumina powder and then mixed using a trommel for 16 hours, resulting in a slurry. The resulting slurry is sifted through a 20 μm sieve, removing impurities, and then subjected to spray drying using a spray drier, resulting in alumina granules having an average particle diameter of approximately 80 μm. The resulting granules are calcined at a temperature of 500° C. in a furnace, which is atmospherically pressured and oxidized atmosphere. The yttria sintered body on which the electrostatic electrode is formed is put in a metal mold. The resulting alumina granules are filled on the yttria sintered body and the electrostatic electrode. Press forming by applying a pressure of 10 kg/cm$^2$ thereupon is conducted. In this manner, an alumina compact is formed.

The integrated body, which includes the yttria sintered body, the electrostatic electrode, and the alumina compact is set in a carbon mold, and then sintered by hot pressing. Specifically, while applying a pressure of 100 kg/cm$^2$, sintering is conducted in a pressured nitrogen atmosphere (nitrogen, 150 kPa). Sintering is conducted with a temperature profile of raising temperature from room temperature to 500° C. at a rate of 500° C./hour, maintaining the temperature at 500° C. for one hour, raising the temperature of 500° C. up to 1000° C. at a rate of 500° C./hour, maintaining the temperature at 1000° C. for one hour, raising the temperature of 1000° C. up to 1600° C. at a rate of 200° C./hour, and then maintaining the temperature at 1600° C. for 2 hours.

The resulting integrated sintered body, which includes the alumina sintered body, the electrostatic electrode, and the yttria sintered body is then processed. Specifically, the base, which includes the alumina sintered body, the yttria sintered body, and the electrostatic electrode buried therein, is processed. More specifically, the surface of the sintered body is ground with a diamond grinding wheel, resulting in the thickness of yttria sintered body, which will be used as a dielectric layer, (distance between the electrostatic electrode and the substrate mounting surface) being 0.35±0.05 mm. The back side and the side of the integrated sintered body are ground, providing a thickness of 3 mm for an electrostatic chuck. Afterwards, a hole allowing insertion of a terminal is formed in the alumina sintered body at the base. Brazing the terminal to the electrostatic electrode is conducted, providing an electrostatic chuck.

Working Example 2

As with the working example 1, yttria granules and alumina granules are prepared. First, the yttria granules are filled in a metal mold. A yttria compact is then formed while applying a pressure of 10 kg/cm$^2$ using a uniaxial pressing apparatus. At this time, the density of the resulting yttria compact is adjusted to be 1.8 g/cc. A niobium electrostatic electrode mesh (mesh electrode) having a wire diameter of 0.12 mm is mounted on the yttria compact. The alumina granules are filled on the yttria compact and the electrostatic electrode and then subjected to press forming, resulting in a layered body including the yttria compact, the electrostatic electrode, and the alumina compact. Note that the yttria compact is formed while applying a pressure of 10 kg/cm$^2$ so that the density of the yttria compact after formation of the layered body can be adjusted to 2 g/cc or less.

The resulting layered body is put in a carbon mold, and sintered by hot pressing. Specifically, sintering is conducted in a pressured nitrogen atmosphere (nitrogen, 150 kPa) while applying a pressure of 100 kg/cm$^2$. More specifically, sintering is conducted with a temperature profile of raising temperature from room temperature to 500° C. at a rater of 500° C./hour, maintaining the temperature at 500° C. for one hour, raising the temperature of 500° C. up to 1000° C. at a rate of 500° C./hour, maintaining the temperature of 1000° C. for one hour, raising the temperature of 1000° C. up to 1600° C. at a rate of 200° C./hour, and then maintaining the temperature at 1600° C. for 2 hours. After sintering, the same processing as with the working example 1 is then carried out, providing an electrostatic chuck.

Working Example 3

Alumina powder having a purity of 99.9 weight % and an average particle size of 0.5 μm, and yttria stabilized zirconia powder (8 mol % YSZ) having a purity of 99.9 weight % and an average particle size of 0.1 μm are prepared as a raw powder for an alumina sintered body. Water, a dispersant, and polyvinyl alcohol (PVA) as a binder are added to 95 weight % alumina and 5 weight % yttria stabilized zirconia powder, and then mixed using a trommel for 16 hours, resulting in a slurry. The resulting slurry is then sifted through a 20 μm sieve, removing impurities, and then subjected to spray drying using a spray drier, resulting in alumina/zirconia granules having an average particle diameter of approximately 80 μm.

Next, the alumina/zirconia granules are filled in a metal mold. Forming an alumina compact including zirconia is then conducted while applying a pressure of 50 kg/cm$^2$ using a uniaxial pressing apparatus. The resulting alumina compact is filled in a carbon mold and then sintered by hot pressing, resulting in an alumina sintered body including zirconia. More specifically, sintering is conducted in a nitrogen atmosphere with a temperature profile of raising temperature from room temperature to 500° C. at a rate of 500° C./hour, maintaining the temperature at 500° C. for one hour, raising the temperature of 500° C. up to 1000° C. at a rate of 500° C./hour, maintaining the temperature at 1000° C. for one hour, raising the temperature of 1000° C. up to 1600° C. at a rate of 200° C./hour, and then maintaining the temperature at 1600° C. for 2 hours.

Afterwards, as with the working example 1, a printing paste is prepared, and the surface of the alumina sintered body on which an electrostatic electrode will be formed is subjected to grinding, resulting in a smooth surface having a flatness of 10 μm or less. An electrostatic electrode having a diameter of 290 mm and a thickness of 30 μm is formed on the smooth surface of the alumina sintered body by screen printing and then dried.

Next, yttria powder having a purity of 99.9 weight % and an average particle size of 1 μm and an alumina powder having a purity of 99.9 weight % and an average particle size of 0.5 μm are prepared as a raw powder for a yttria sintered body. Water, a dispersant, and polyvinyl alcohol (PVA) as a binder are added to a mixed powder of 90 weight % yttria powder and 10 weight % alumina powder, and then mixed using a trommel for 16 hours, resulting in a slurry. The resulting slurry is then sifted through a 20 μm sieve, removing impurities, and then spray dried using a spray drier, resulting in yttria/alumina granules having an average particle diameter of approximately 80 μm. The resulting granules are calcined in a furnace, which is atmospherically pressure and oxidized atmosphere at a temperature of 500° C., degreasing, and adjusting the water content to 1% or less.

An alumina sintered body on which an electrostatic electrode is formed is set in a metal mold. The resulting yttria/alumina granules are filled on the alumina sintered body and the electrostatic electrode. Forming a yttria compact while applying a pressure of 10 kg/cm$^2$ by the uniaxial pressing apparatus is conducted. At this time, the density of the yttria compact is adjusted to 1.7 g/cc.

The integrated body including the alumina sintered body, the electrostatic electrode, and the yttria compact is put in carbon mold and then sintered by hot pressing. Specifically, sintering is conducted in a pressured nitrogen atmosphere while applying a pressure of 100 kg/cm$^2$ (nitrogen, 150 kPa). Sintering is conducted with a temperature profile of raising temperature from room temperature to 500° C. at a rate of 500° C./hour, maintaining the temperature at 500° C. for one hour, raising the temperature of 500° C. up to 1000° C. at a rate of 500° C./hour, maintaining the temperature at 1000° C. for one hour, raising the temperature of 1000° C. up to 1600° C. at a rate of 200° C./hour, and then maintaining the temperature at 1600° C. for 2 hours. The resulting integrated sintered body including the alumina sintered body, the electrostatic electrode, and the yttria sintered body is processed in the same manner as with the working example 1.

Evaluation

The electrostatic chucks provided in the working examples 1 to 3 are subjected to the following evaluations (1) to (6):

(1) Mechanical strength: Four-point bending strength of the alumina sintered body constituting part of the base is measured at room temperature in conformity with JIS R1601.

(2) Volume resistivity: Volume resistivity of the yttria sintered body, which is used as a dielectric layer, is measured at room temperature in conformity with JIS C2141; wherein an applied voltage is 2000 V/mm;

(3) Relative density: Relative density of the yttria sintered body, which is used as a dielectric layer, is measured using the Archimedean method with pure water as a medium.

(4) Thermal expansion coefficient: thermal expansion coefficient of the alumina sintered body and the thermal expansion coefficient of the yttria sintered body are measured at temperatures ranging from room temperature to 1200° C. in conformity with JIS R1618.

(5) Corrosion resistance test: A part of the yttria sintered body to be exposed to a corrosive gas is masked and kept for 5 hours in a mixture gas of NF3 and oxygen while supplying a plasma source power of 800 W and a biasing power of 300 W and applying a pressure of 0.1 Torr; thereby conducting a corrosion resistance test. After the corrosion resistance test, the resulting difference in height due to corrosion between the masked region and the unmasked region is measured. This difference in height is evaluated as the reduced amount due to the corrosion (hereafter, referred to as 'corrosion wastage amount'). In this manner, the corrosion resistance is evaluated.

(6) Intermediate layer analysis: Composition of the intermediate layer formed between the alumina sintered body and the yttria sintered body is analyzed using an electron probe micro-analyzer (EPMA) and an x-ray diffraction analyzer (X-ray). Moreover, in the electrostatic chuck of the working example 1, the intermediate layer and surrounding thereof in an outer region of the electrostatic electrode are observed using a scanning electron microscope (SEM).

TABLE 1 shows evaluation results of (1) to (6) along with compositions of the alumina sintered body and the yttria sintered body according to the working examples 1 to 3. FIG. 7 is an observation picture taken by the SEM.

TABLE 1

| | COMPOSITION OF ALUMINA SINTERED BODY (WEIGHT %) | COMPOSITION OF YTTRIA SINTERED BODY (WEIGHT %) | FOUR-POINT BENDING STRENGTH OF ALUMINA SINTERED BODY (MPa) | VOLUME RESISTIVITY (Ω·cm) | RELATIVE DENSITY (%) | DIFFERENCE IN COEFFICIENT OF THERMAL EXPANSION (/K) | CORROSION WASTAGE AMOUNT (μm) | INTERMEDIATE LAYER |
|---|---|---|---|---|---|---|---|---|
| WORKING EXAMPLE 1 | ALUMINA >99.9 | YTTRIA >99.9 | 460 | >1 × 10$^{16}$ | 99.8 | 0.3 × 10$^{-6}$ | 0.6 | YAG LAYER + YAM LAYER |
| WORKING EXAMPLE 2 | ALUMINA >99.9 | YTTRIA >99.9 | 460 | >1 × 10$^{16}$ | 99.8 | 0.3 × 10$^{-6}$ | 0.6 | YAG LAYER + YAM LAYER |
| WORKING EXAMPLE 3 | ALUMINA: 95 ZIRCONIA: 5 | YTTRIA: 90 ALUMINA: 10 | 620 | 5 × 10$^{15}$ | 99.9 | 0.1 × 10$^{-6}$ | 0.8 | YAG LAYER + YAM LAYER |

The alumina sintered body constituting a part of the base in each of the electrostatic chucks according to the respective working examples 1 to 3 has a high four-point bending strength and high mechanical strength in room temperature. The yttria sintered body in each of the electrostatic chucks according to the working examples 1 to 3 has a high volume resistivity of 1×10$^{15}$ Ω·cm or greater in room temperature that is a sufficient value for the dielectric layer of the electrostatic chuck using Coulombic force for providing a high chucking force.

The relative density of the yttria sintered body in each of the electrostatic chucks according to the working examples 1 to 3 is 98% or greater, i.e., very high, allowing for the provision of a very dense sintered body. The difference between the thermal expansion coefficient of the alumina sintered body and the yttria sintered body in each of the electrostatic chucks according to the respective working examples 1 to 3 is kept small. Moreover, the corrosion wastage amount of the yttria sintered body in each of the electrostatic chucks, according to the respective working examples 1 to 3, measured through the corrosion resistance test is very low, which means surface corrosion is minute amount, proving to have high corrosion resistance.

In each of the electrostatic chucks in the respective working examples 1 to 3, the intermediate layer including yttrium and aluminum is formed between the alumina sintered body and the yttria sintered body. More specifically, the intermediate layer including the YAG layer and the YAM layer is formed. For example, in the electrostatic chuck according to the working example 1 as shown in FIG. 7, a YAG layer 14b and a YAM layer 14a are formed between the alumina sintered body 12 and the yttria sintered body 13. In other words, the intermediate layer 14 includes multiple layers having respectively different contents of yttrium and aluminium.

What is claimed is:

1. A ceramic member comprising:
a base including an alumina sintered body, a yttria sintered body formed on the alumina sintered body and exposed to a corrosive gas, and an intermediate layer including yttrium and aluminum formed between the alumina sintered body and the yttria sintered body; and
a metallic member buried in the intermediate layer of the base;
wherein a difference between a thermal expansion coefficient of the alumina sintered body and a thermal expansion coefficient of the yttria sintered body is equal to or less than about $0.50 \times 10^{-6}$/K;
wherein the thermal expansion coefficient of the alumnina sintered body is greater than the thermal expansion coefficient of the yttria sintered body;
wherein the alumina sintered body, the intermediate layer, the yttria sintered body, and the metallic member are formed into an integrated sintered body; and
wherein a content of yttria in the yttria sintered body is 99 wt % or more.

2. The ceramic member according to claim 1, wherein the intermediate layer includes a plurality of layers each having different yttrium and aluminum contents with respect to one another.

3. The ceramic member according to claim 1, wherein a difference between a thermal expansion coefficient of the metallic member and the thermal expansion coefficient of the alumina sintered body, and a difference between the thermal expansion coefficient of the metallic member and the thermal expansion coefficient of the yttria sintered body are equal to or less than about $3 \times 10^{-6}$/K.

4. The ceramic member according to claim 1, wherein the metallic member is a least one of an electrostatic electrode, a resistance heating element, and an RF electrode.

5. The ceramic member according to claim 1, wherein a volume resistivity of the yttria sintered body is equal to or greater than about $1 \times 10^{15}$ Ω·cm.

6. The ceramic member according to claim 1, wherein a thickness of the yttria sintered body is about 0.3 to about 0.5 mm.

7. The ceramic member according to claim 1, further comprising:
a terminal connecting the metallic member to a power supply member; and
a connecting member buried in the base, joined with the metallic member and the terminal, and connecting the metallic member to the terminal.

8. The ceramic member according to claim 7, wherein a difference between a thermal expansion coefficient of the connecting member and the thermal expansion coefficient of the alumina sintered body is equal to or less than about $2 \times 10^{-6}$/K.

9. The ceramic member according to claim 7, wherein the connecting member includes at least one of platinum and niobium.

10. The ceramic member according to claim 7, wherein a distance between a joint surface of the connecting member and the metallic member and a joint surface of the connecting member and the terminal is equal to or greater than about 1 mm.

11. A method of manufacturing a ceramic member, comprising the steps of:
forming an alumina sintered body;
forming a yttria sintered body exposed to a corrosive gas, wherein a content of yttria in the yttria sintered body is 99 wt % or more;
forming a metallic member; and
integrating the alumina sintered body, the yttria sintered body and the metallic member;
wherein an intermediate layer including yttrium and aluminum is formed between the alumina sintered body and the yttria sintered body;
wherein the metallic member is buried in the intermediate layer;
wherein a difference between a thermal expansion coefficient of the alumina sintered body and a thermal expansion coefficient of the yttria sintered body is equal to or less than about $0.50 \times 10^{-6}$/K; and
wherein the thermal expansion coefficient of the alumina sintered body is greater than the thermal expansion coefficient of the yttria sintered body.

12. The method according to claim 11, wherein
the step of forming the alumina sintered body includes a step of forming an alumina presintered body;
wherein the metallic member is formed on one of the alumina sintered body and the alumina presintered body;
wherein the step of forming the yttria sintered body includes forming a yttria compact on the metallic member; and
wherein the one of the alumina sintered body and the alumina presintered body, the metallic member, and the yttria compact are integrated by sintering.

13. The method according to claim 11, wherein
the step of forming the yttria sintered body includes a step of forming a yttria presintered body;
wherein the metallic member is formed on one of the yttria sintered body and the yttria presintered body;
wherein the step of forming the alumina sintered body includes forming an alumina compact on the metallic member; and
wherein the one of the yttria sintered body and the yttria presintered body, the metallic member, and the alumina compact are integrated by sintering.

14. The method according to claim 11, wherein the yttria sintered body is formed using a yttria powder that is calcined at about 400° C. or greater.

15. The method according to claim 11, wherein the yttria sintered body is formed using a yttria powder having a water content that is equal to or less than about 1%.

16. The method according to claim 11, wherein the yttria sintered body is formed by sintering a yttria compact having a density that is equal to or less than about 2 g/cc.

* * * * *